(12) United States Patent
Kim et al.

(10) Patent No.: US 10,704,799 B2
(45) Date of Patent: Jul. 7, 2020

(54) MOVEABLE AIR CONDITIONER

(71) Applicant: Hanon Systems, Daejeon (KR)

(72) Inventors: Yeon Seob Kim, Daejeon (KR); Dong Woo Kim, Daejeon (KR); Jeong Hoon Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/772,595

(22) PCT Filed: May 19, 2017

(86) PCT No.: PCT/KR2017/005257
§ 371 (c)(1),
(2) Date: May 1, 2018

(87) PCT Pub. No.: WO2017/204499
PCT Pub. Date: Nov. 30, 2017

(65) Prior Publication Data
US 2019/0120518 A1     Apr. 25, 2019

(30) Foreign Application Priority Data

May 23, 2016  (KR) .......................... 10-2016-0062734
Sep. 5, 2016   (KR) .......................... 10-2016-0113716

(51) Int. Cl.
*F24F 11/00*     (2018.01)
*F24F 11/79*     (2018.01)
(Continued)

(52) U.S. Cl.
CPC ................ *F24F 11/79* (2018.01); *F24F 1/02* (2013.01); *F24F 11/52* (2018.01); *F24F 11/56* (2018.01);
(Continued)

(58) Field of Classification Search
CPC ...... F24F 1/04; F24F 2120/00; F24F 2120/10; F24F 2120/12; F24F 2120/14; F24F 2120/20; F24F 2221/12; F24F 2221/125
See application file for complete search history.

(56) References Cited

U.S. PATENT DOCUMENTS

2015/0204556 A1*  7/2015  Kusukame .......... B60H 1/00742
                                                        165/237

FOREIGN PATENT DOCUMENTS

JP    2007-046795 A    2/2007
KR    20050012197 A    1/2005
(Continued)

*Primary Examiner* — Jonathan Bradford
(74) *Attorney, Agent, or Firm* — Norton Rose Fulbright US LLP; James Crawford

(57) ABSTRACT

A movable air conditioner includes an air conditioner main body, an air conditioning unit installed in the air conditioner main body and configured to generate a cold air or a warm air, a moving unit configured to move the air conditioner main body, a control unit configured to control the air conditioning unit and the moving unit, and a human body recognition unit configured to recognize a person existing in a specific space. The control unit is configured to control the moving unit so that the air conditioner main body is moved toward the person recognized by the human body recognition unit so as to supply the cold air or the warm air from the air conditioning unit to the person recognized by the human body recognition unit.

18 Claims, 18 Drawing Sheets

(51) Int. Cl.
*F24F 1/02* (2019.01)
*G06K 9/00* (2006.01)
*F24F 11/56* (2018.01)
*F24F 11/52* (2018.01)
*F24F 140/50* (2018.01)
*F24F 120/12* (2018.01)

(52) U.S. Cl.
CPC ...... G06K 9/00362 (2013.01); *F24F 2120/12* (2018.01); *F24F 2140/50* (2018.01); *F24F 2221/42* (2013.01)

(56) References Cited

FOREIGN PATENT DOCUMENTS

| | | | |
|---|---|---|---|
| KR | 20090099296 | A | 9/2009 |
| KR | 20120036141 | A | 4/2012 |
| KR | 20130047083 | A | 5/2013 |

* cited by examiner 62a        62a 62a   62a

MOVEABLE AIR CONDITIONER

CROSS REFERENCE TO RELATED APPLICATIONS

This application is a § 371 of International Application No. PCT/KR2017/005257, filed May 19, 2017, which claims priority from Korean Patent Application No. 10-2016-0062734 filed May 23, 2016 and 10-2016-0113716 filed Sep. 5, 2016.

TECHNICAL FIELD

The present invention relates to a movable air conditioner and, more particularly, to a movable air conditioner capable of recognizing a person and performing a cooling or heating operation on the basis of a person, capable of performing a close cooling or heating operation while tracing a recognized person, and capable of moving in response to a user's wireless call command and actively heating or cooling a designated place.

BACKGROUND ART

There is known an air conditioner as a device for keeping comfortable a certain space such as a room or the like (hereinafter generally referred to as "room").

The air conditioner is provided with a compressor, a heating heat exchanger, an expansion valve, and a cooling heat exchanger. The air conditioner is configured to blow a cold air generated in the cooling heat exchanger into a room so as to cool the room, or to blow a warm air generated in the heating heat exchanger into a room so as to heat the room.

However, most of the conventional air conditioners are fixedly installed at one place in a room. Therefore, when only one region of the room is to be locally cooled and heated, the conventional air conditioners cannot cope with such a need.

Particularly, when a room is wide, even if it is desired to cool and heat the room locally, there is no way but to cool and heat the entire room. Thus, unnecessary energy consumption occurs due to such a disadvantage.

In addition, since the conventional air conditioner is fixedly installed at one place in a room, the discharge direction of a cold air or a warm air is limited. Thus, the cold air or the warm air may not be blown toward a specific region in a room, or there may be generated a dead zone in which the blowing amount of a cold or a warm air is remarkably low. Due to such a problem, the cooling and heating efficiency of a room is remarkably lowered.

Under the circumstances, various air conditioners capable of locally cooling and heating a specific region in a room and capable of efficiently cooling and heating dead zone have been developed.

As an example thereof, there is known a movable air conditioner. As shown in FIG. 1, the movable air conditioner is configured to move an air conditioning unit 1 that performs an air conditioning operation. After the air conditioning unit 1 is moved to a place where cooling or heating is required, the air conditioning unit 1 is operated to supply a cold air or a warm air.

Specifically, in a heating mode, the warm air discharged from a heating heat exchanger 1a of the air conditioning unit 1 is supplied. In a cooling mode, the cold air discharged from a cooling heat exchanger 1b of the air conditioning unit 1 is supplied. Therefore, it is possible to locally cool or heat a place where air conditioning is required. In addition, it is possible to effectively cool or heat a cooling/heating dead zone.

The movable air conditioner includes a detection unit 3 configured to detect an air conditioning load in a room, a moving unit 5 configured to move the air conditioning unit 1, and a control unit 7 configured to control the moving unit 5 so as to move the air conditioning unit 1 toward the air conditioning load.

Specifically, the control unit 7 uses the detection unit 3 to detect the air conditioning load that requires an air conditioning operation. Then, the control unit 7 controls the moving unit 5 to move the air conditioning unit 1 toward the detected air conditioning load, and operates the air conditioning unit 1 moved toward the air conditioning load.

Thus, the movable air conditioner detects an air conditioning load requiring an air conditioning operation in a room and moves toward the air conditioning load. Then, the movable air conditioner supplies a cold air or a warm air toward the air conditioning load and automatically cools or heats the air conditioning load.

Such a conventional movable air conditioner is configured to detect an air conditioning load and to perform a cooling/heating operation on the basis of the detected air conditioning load. Therefore, when the detected air conditioning load does not coincide with the region to be actually cooled or heated, it is impossible to cool or heat the region to be actually cooled or heated.

In a room, a region where cooling or heating is most required is a space where a person is present. However, the conventional movable air conditioner is designed to perform a cooling or heating operation on the basis of an air conditioning load. Thus, there may be a case where the movable air conditioner moves to a place where an air conditioning load is high, for example, a window or a door, and then cools or heats such a place.

Due to such a disadvantage, the conventional movable air conditioner frequently suffers from an operation error in which an unnecessary region is cooled or heated.

In the conventional movable air conditioner, even in a cooling mode, a warm air (hereinafter referred to as "waste warm air") continues to be generated from the heating heat exchanger 1a and, even in a heating mode, a cold air (hereinafter referred to as "waste cold air") continues to be generated from the cooling heat exchanger 1b. The waste warm air or the waste cold air thus generated may be discharged toward a person.

Particularly, when the air conditioning unit 1 is moved toward the air conditioning load in the room by controlling the moving unit 5, the waste air exhaust port 1c of the air conditioning unit 1 for discharging the waste cold air or the waste warm air may face the human body. In such a case, the waste cold air or the waste warm air may be discharged toward the human body through the waste air exhaust port 1c. Thus, the person existing around the waste air exhaust port 1c may feel unpleasant.

SUMMARY OF THE INVENTION

In view of the aforementioned problems inherent in the related art, it is an object of the present invention to provide a movable air conditioner capable of recognizing a person and actively cooling or heating a place where the person exists.

Another object of the present invention is to provide a movable air conditioner capable of accurately cooling or heating a place where cooling or heating is actually required, and consequently improving the cooling or heating efficiency.

A further object of the present invention is to provide a movable air conditioner capable of closely cooling or heating a person while following the person.

A still further object of the present invention is to provide a movable air conditioner capable of enhancing the cooling or heating effect.

A yet still further object of the present invention is to provide a movable air conditioner capable of actively and variably controlling the temperature and the flow rate of a cold air or a warm air depending on the body temperature of a person, capable of optimally supplying a cold air or a warm air, and capable of providing enhanced comfort to a person.

An even yet still further object of the present invention is to provide a movable air conditioner capable of providing an improved structure and control logic so as to prevent a waste air exhaust port from facing a person.

An additional object of the present invention is to provide a movable air conditioner capable of preventing a waste cold air or a waste warm air from being discharged from a waste air exhaust port toward a person.

A still additional object of the present invention is to provide a movable air conditioner capable of preventing a waste cold air or a waste warm air from giving a person an unpleasant feeling.

In order to achieve the above objects, there is provided a movable air conditioner, including: an air conditioner main body; an air conditioning unit installed in the air conditioner main body and configured to generate a cold air or a warm air; a moving unit configured to move the air conditioner main body; a control unit configured to control the air conditioning unit and the moving unit; and a human body recognition unit configured to recognize a person existing in a specific space, wherein the control unit is configured to control the moving unit so that the air conditioner main body is moved toward the person recognized by the human body recognition unit so as to supply the cold air or the warm air from the air conditioning unit to the person recognized by the human body recognition unit.

In the movable air conditioner the human body recognition unit may include an infrared image sensor configured to capture an image of the specific space, sense infrared rays emitted from an object or a person existing in the specific space and divide the image of the specific space into matrix type image cells, and the control unit may be configured to recognize a human body of a person by processing infrared-sensed image cells among the matrix type image cells inputted from the infrared image sensor.

In the movable air conditioner, the control unit may be configured to measure a body temperature of a person and a surrounding temperature using infrared rays sensed by the infrared image sensor, calculate a cooling or heating load based on the body temperature and the surrounding temperature, and variably control the air conditioning unit according to the cooling or heating load to variably control a temperature of an air blown toward a person.

In the movable air conditioner, when the person recognized by the human body recognition unit is moved to another place, the control unit may control the moving unit in response to the movement of the person so that the air conditioner main body follows the person.

The movable air conditioner may further include: a remote control terminal provided with a call portion capable of inputting a call command and configured to wirelessly transmit the call command inputted through the call portion; and a position information providing unit configured to provide position information of the remote control terminal, wherein the control unit may be configured to wirelessly receive the call command transmitted from the remote control terminal and the position information of the remote control terminal transmitted from the position information providing unit, and when the call command is wirelessly transmitted from the remote control terminal, the control unit may be converted into a call mode to control the moving unit according to the position information of the remote control terminal received from the position information providing unit so that the air conditioner main body is moved toward the remote control terminal.

In the movable air conditioner, the air conditioner main body may include an air discharge port configured to discharge the cold air or the warm air generated in the air conditioning unit to a place to be cooled or heated, a waste air exhaust port configured to discharge a waste cold air or a waste warm air not used for cooling or heating, and an auxiliary detection unit configured to detect a surrounding region of the waste air exhaust port, and the control unit may be configured to adjust an air discharge direction of the waste air exhaust port depending on a detection result of the auxiliary detection unit.

In the movable air conditioner, the auxiliary detection unit may be configured to detect a person and an object existing in the surrounding region of the waste air exhaust port, and when the auxiliary detection unit detects a person existing in the surrounding region of the waste air exhaust port, the control unit may control the moving unit to adjust a position of the air conditioner main body so that the waste air exhaust port faces a region where a person is not present.

According to the movable air conditioner of the present invention, cooling or heating is performed on the basis of a human body of a person recognized by a human body recognition unit. It is therefore possible to accurately cool or heat a region where cooling or heating is actually required. This makes it possible to significantly improve the cooling or heating efficiency.

Furthermore, cooling or heating is closely performed while following the person recognized by the human body recognition unit. Therefore, even if a person moves, it is possible to keep the environment around a person comfortable. This makes it possible to enhance the cooling or heating effect.

Furthermore, the temperature or the flow rate of a cold air or a warm air is actively and variably controlled depending on the body temperature of a person and the temperature around a person. It is therefore possible to optimally supply a cold air or a warm air to a person. This makes it possible to give a person a comfortable feeling.

Furthermore, the movable air conditioner is configured to move toward a designated place in response to a user's wireless call command issued through a remote control terminal. It is therefore possible to actively cool or heat a place designated by a user. This makes it possible to enhance the user's convenience.

In addition, when a person existing around a waste air exhaust port is detected, the position of the movable air conditioner is controlled so as to orient the waste air exhaust port toward a region where a person does not exist. This makes it possible to prevent the waste air exhaust port from facing a person. As a result, it is possible to prevent a waste cold air or a waste warm air from being discharged from the waste air exhaust port toward a person. This makes it possible to prevent a waste cold air or a waste warm air from giving a person an unpleasant feeling.

MODE FOR CARRYING OUT THE INVENTION

Preferred embodiments of a movable air conditioner according to the present invention will now be described in detail with reference to the accompanying drawings.

First Embodiment

Figure 1:
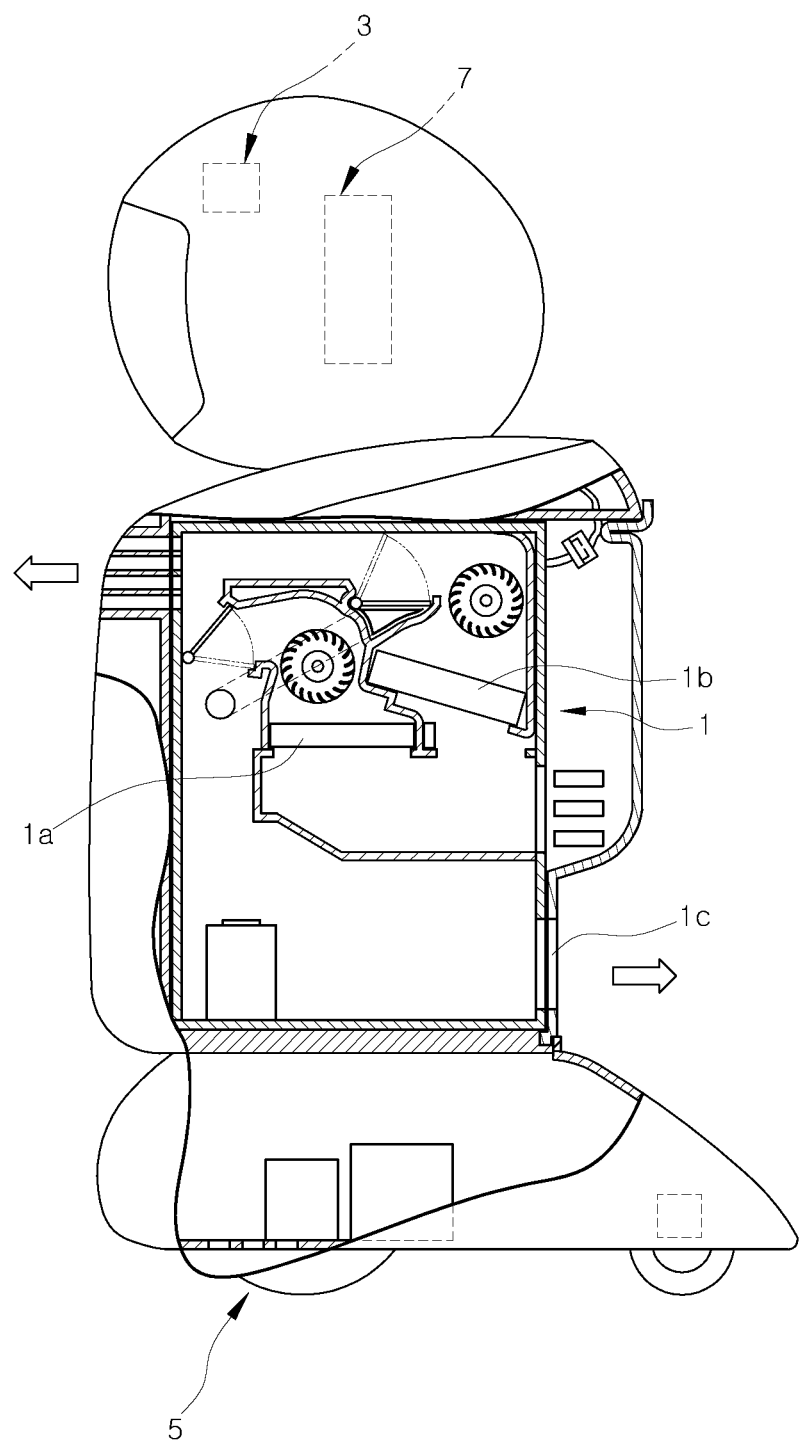
FIG. 1 is a side sectional view showing a conventional movable air conditioner.
Figure 2:
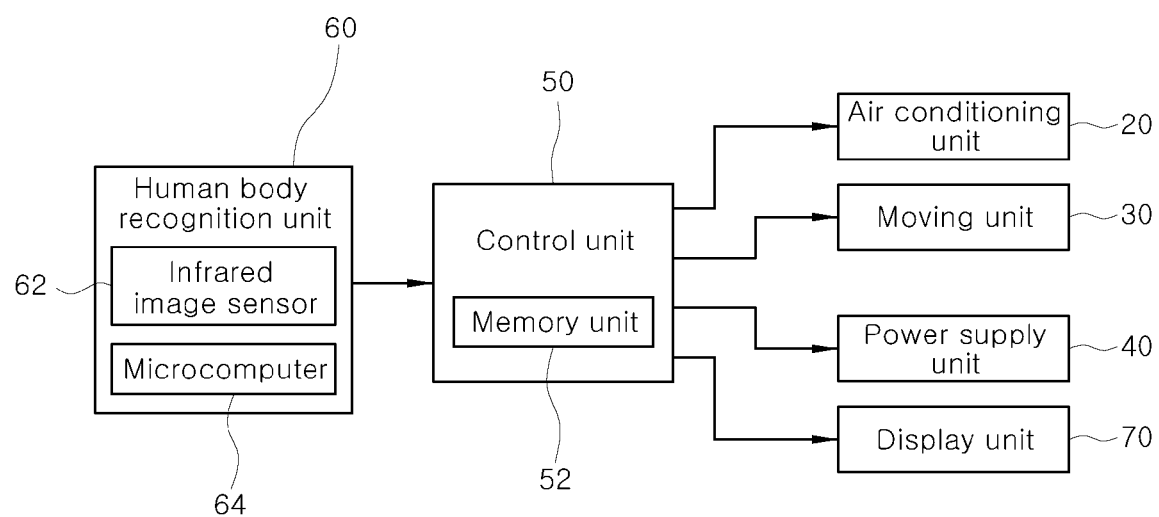
FIG. 2 is a block diagram showing a movable air conditioner according to a first embodiment of the present invention.

Prior to describing the features of a movable air conditioner according to the present invention, the basic configuration of the movable air conditioner will be briefly described with reference to FIGS. 2 and 3.

The movable air conditioner includes an air conditioner main body 10, an air conditioning unit 20, a moving unit 30, a power supply unit 40 and a control unit 50, latter four of which are installed in the air conditioner main body 10.

Figure 3:
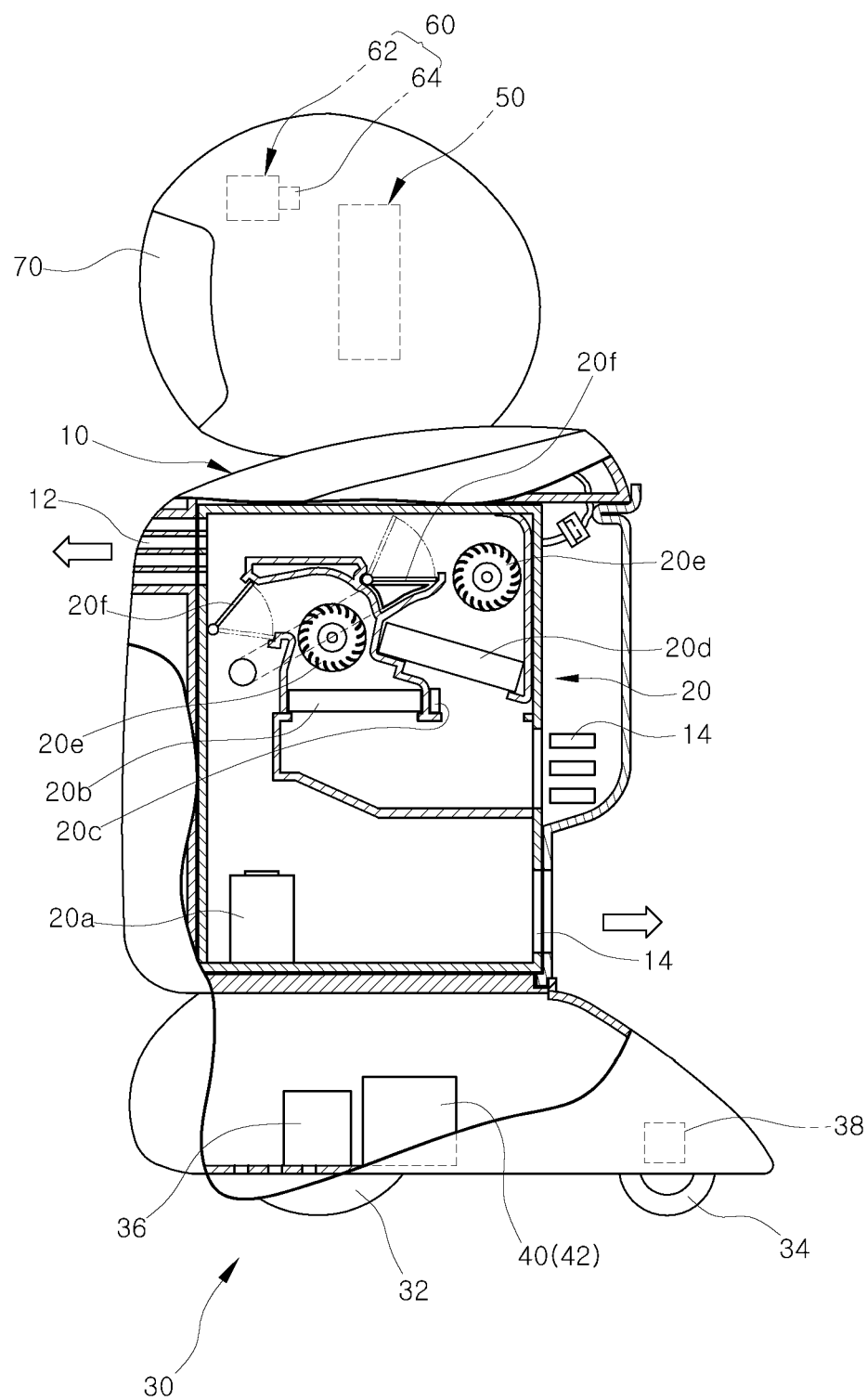
FIG. 3 is a side sectional view showing the movable air conditioner according to the first embodiment of the present invention.

As shown in FIG. 3, the air conditioning unit 20 includes a compressor 20a, a heating heat exchanger 20b, an expansion valve 20c, a cooling heat exchanger 20d, blower fans 20e and a an opening/closing door 20f. A refrigerant is compressed by the compressor 20a and is circulated so that a warm air is generated in the heating heat exchanger 20b and a cold air is generated in the cooling heat exchanger 20d.

In a heating mode, the warm air generated in the heating heat exchanger 20b is fed to an air discharge port 12 formed on the front surface of the air conditioner main body 10 and is then blown into a room through the air discharge port 12, thereby heating the interior of the room.

In a cooling mode, the cold air generated in the cooling heat exchanger 20d is fed to the air discharge port 12 formed on the front surface of the air conditioner main body 10 and is then blown into a room through the air discharge port 12, thereby cooling the interior of the room.

During the heating mode, the waste cold air generated in the cooling heat exchanger 20d is discharged to the outside through a waste air exhaust port 14 formed in the air conditioner main body 10. During the cooling mode, the waste warm air generated in the heating heat exchanger 20b is discharged to the outside through the waste air exhaust port 14 of the air conditioner main body 10.

The waste air exhaust port 14 is formed on the rear surface of the air conditioner main body 10. The waste air exhaust port 14 allows a waste cold air or a waste warm air to be discharged backward of the air conditioner main body 10.

The moving unit 30 includes a driving wheel 32, a steering wheel 34, a driving motor 36 configured to drive the driving wheel 32, and a steering motor 38 configured to control the steering wheel 34. The moving unit 30 is operated by electric power applied thereto and is configured to move the air conditioner main body 10 to a designated place.

The power supply unit 40 includes a battery 42 and supplies electric power to the air conditioning unit 20 and the moving unit 30. Thus, the air conditioning unit 20 and the moving unit 30 can be driven.

The battery 42 is rechargeable. When electric power is used up, the battery 42 is charged with electric power through a charging station (not shown).

The control unit 50 includes a microprocessor. The control unit 50 is configured to control the air conditioning unit 20, the moving unit 30 and the power supply unit 40. Specifically, the control unit 50 controls the air conditioning unit 20 so as to blow a cold air or a warm air. The control unit 50 controls the moving unit 30 to move the air conditioner main body 10 to a specific place. When the electric power of the battery 42 of the power supply unit 40 is used up, the control unit 50 controls the moving unit 30 so as to move the air conditioner main body 10 toward the charging station.

The control unit 50, the air conditioning unit 20, the moving unit 30 and the power supply unit 40 are well-known in the art and, therefore, will not be described in detail.

Next, the features of the movable air conditioner according to the present invention will be described with reference to FIGS. 2 and 3.

The movable air conditioner according to the present invention further includes a human body recognition unit 60 configured to recognize a human body.

The human body recognition unit 60 includes an infrared image sensor 62 configured to capture an image in a room, and a microcomputer 64 configured to recognize a human body based on an image data inputted from the infrared image sensor 62.

The infrared image sensor 62 is a sensor capable of sensing infrared rays emitted from a human body and is installed in the front upper portion of the air conditioner main body 10.

Figure 4:
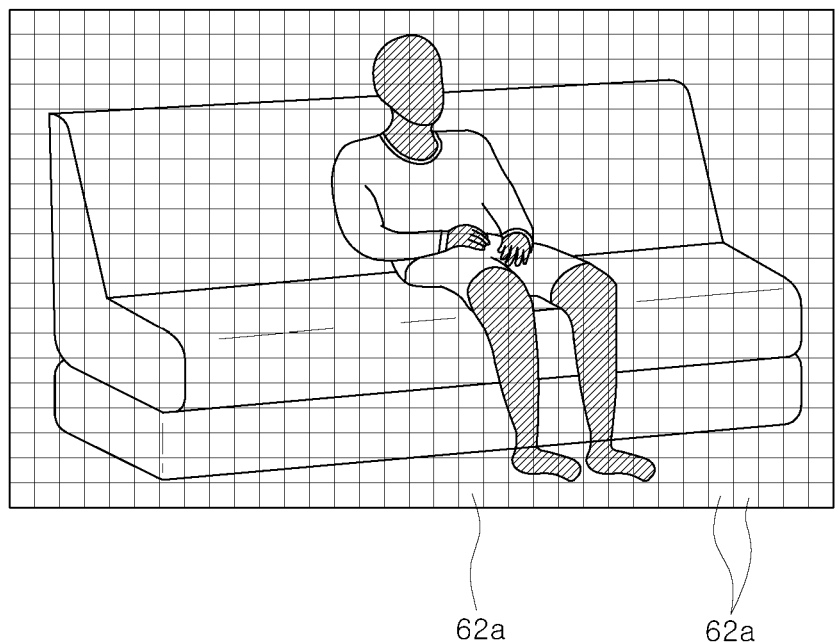
FIGS. 4 and 5 are views showing states in which a specific space is imaged in a matrix form by an infrared image sensor of the movable air conditioner of the present invention.

As shown in FIG. 4, the infrared image sensor 62 captures an image of a specific space in a room and then divides the captured image into image cells 62a in the form of a matrix.

The microcomputer 64 stores an infrared ray analysis program. When the image cells 62a having a matrix form are inputted from the infrared image sensor 62, the microcomputer 64 recognizes a person by processing the image cells 62a inputted from the infrared image sensor 62.

For example, the microcomputer 64 determines whether the distribution of infrared-sensed image cells 62a among the inputted image cells 62a corresponds to a predetermined reference human body cell distribution. Specifically, the microcomputer 64 determines whether the distribution of infrared-sensed image cells 62a is included in a reference human body cell distribution having a human body shape.

If is determined that the distribution of infrared-sensed image cells 62a is included in the reference human body cell distribution, the microcomputer 64 recognizes a person existing in a room and inputs the recognition result to the control unit 50.

The microcomputer 64 includes an infrared receiving unit (not shown) capable of receiving infrared rays reflected from a human body. Based on the infrared rays received via the infrared receiving unit, the microcomputer 64 acquires human position information such as a direction of a person and a distance to a person. Then, the microcomputer 64 inputs the human position information to the control unit 50.

When the human body is recognized by the human body recognition unit 60 and when the human position information is provided, the control unit 50 controls the moving unit 30 so as to move the air conditioner main body 10 toward a place where a person exists.

After the air conditioner main body 10 is moved to the place where the person exists, the control unit 50 controls the air conditioning unit 20 so as to blow a cold air or a warm air toward the person. As a result, the spatial region where the person exists is locally cooled or heated. This makes it possible to enhance the comfort in the spatial region where the person exists.

The control unit 50 measures a body temperature of a person and a surrounding temperature using the image cells 62a inputted from the human body recognition unit 60 and measures a cooling or heating load in the spatial region where the person exists.

Depending on the cooling or heating load thus measured, the control unit 50 actively and variably controls the compressor 20a and the expansion valve 20c of the air conditioning unit 20 and the blower fans 20e so that an air having an optimal temperature is blown toward the spatial region where the person exists.

Specifically, depending on the cooling or heating load, the control unit 50 actively and variably controls the air conditioning unit 20 in a cooling mode or a heating mode. By way of such variable control, the control unit 50 makes sure that an air having an optimal temperature and a suitable flow rate is supplied to the spatial region where the person exists. As a result, the air having an optimal temperature is supplied to the person, thereby providing enhanced comfort to the person.

The control unit 50 stores a program for converting the intensity of infrared rays emitted from a human body and the intensity of infrared rays emitted from a surrounding object into a human body temperature and a surrounding temperature. In addition, a table in which cooling or heating load values are associated with human body temperatures and surrounding temperatures is stored in a memory unit 52.

When the image cells 62a of the human body and the surrounding object are inputted from the human body recognition unit 60, the control unit 50 acquires a human body temperature and a surrounding temperature using the program stored therein and reads a cooling or heating load value corresponding to the human body temperature and the surrounding temperature from the memory unit 52. The control unit 50 controls the air conditioning unit 20 according to the cooling or heating load value thus read.

The cooling or heating load values associated with the human body temperatures and the surrounding temperatures, which are stored as a table in the memory unit 52, are experimental data obtained through repeated tests.

In the present embodiment, the microcomputer 64 of the human body recognition unit 60 for recognizing a person is separated from the control unit 50. If necessary, the control unit 50 may play a role of the microcomputer 64.

In this case, the matrix-like image cells 62a obtained by the infrared image sensor 62 are directly inputted to the control unit 50. The control unit 50 recognizes a person existing in a room based on the inputted image cells 62a.

Figure 5:
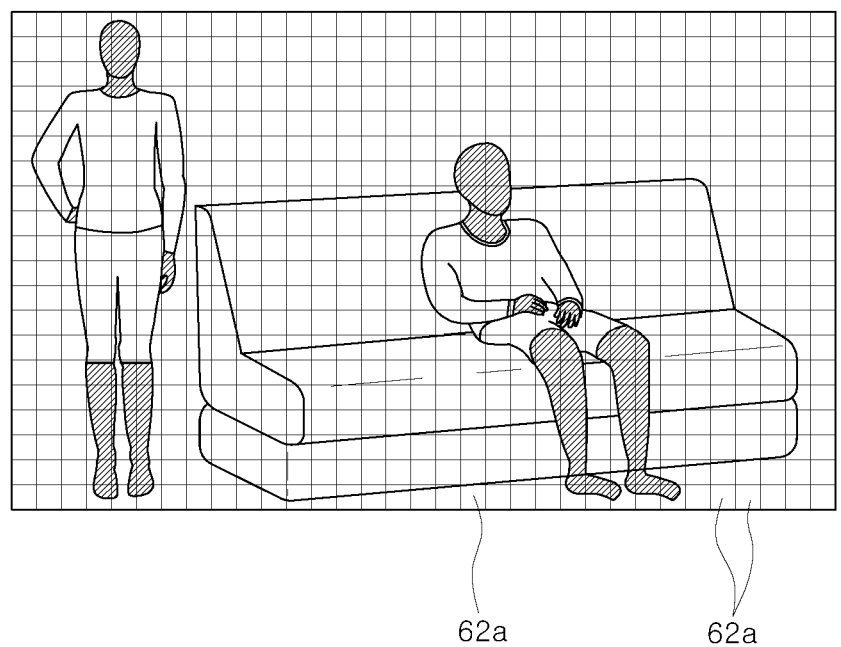
Figure 6:
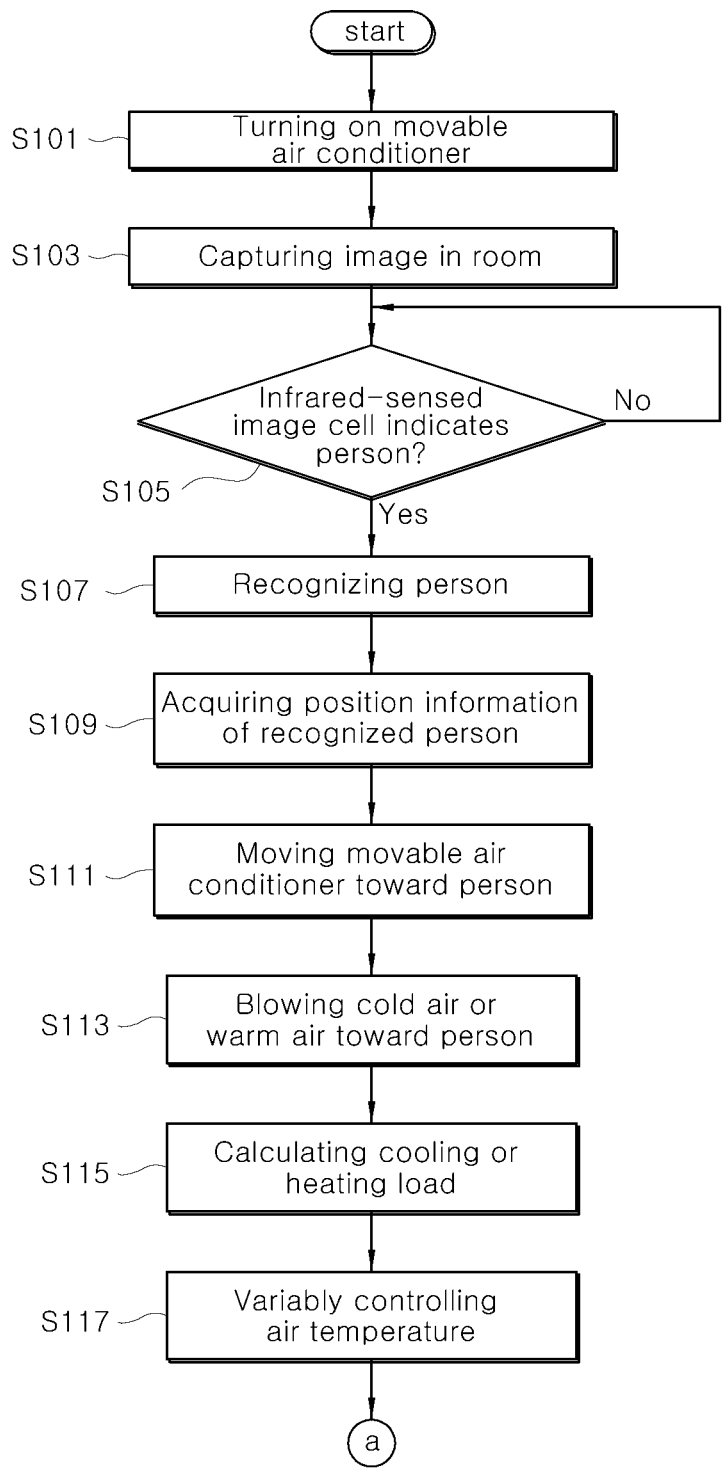
FIGS. 6 and 7 are flowcharts showing an operation example of the movable air conditioner of the present invention.
Figure 7:
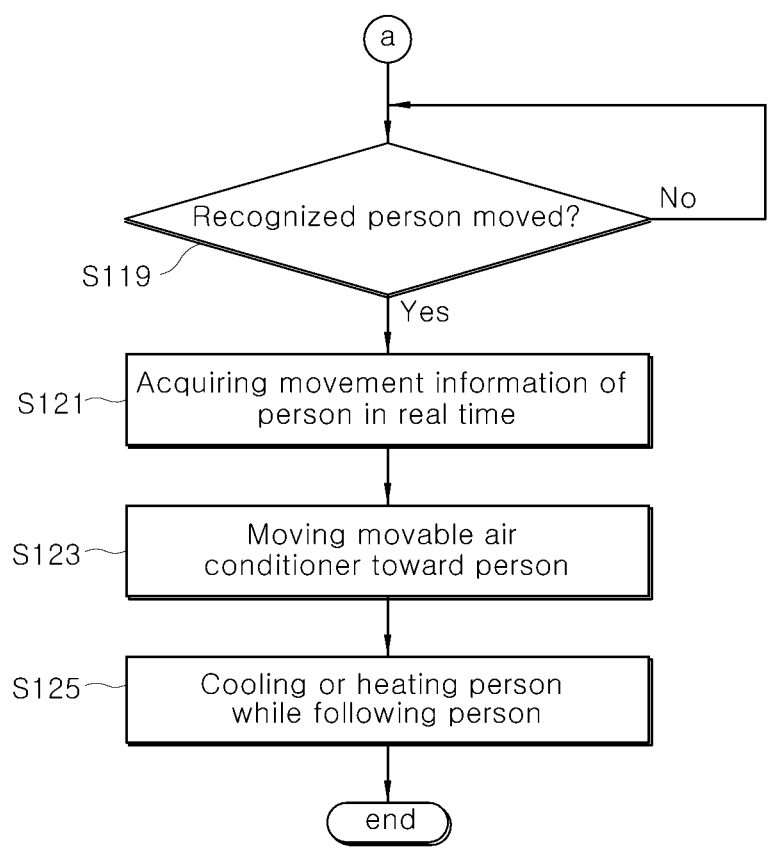

Referring again to FIGS. 2 and 3, when the control unit 50 recognizes a human body using the image cells 62a inputted from the infrared image sensor 62, there may be a case where two or more persons are simultaneously recognized as shown in FIG. 5.

In this case, if the current mode is a cooling mode, the control unit 50 is configured to select a person having a highest body temperature among the two or more persons.

When the person having a highest body temperature is selected, the control unit 50 controls the moving unit 30 and the air conditioning unit 20 on the basis of the selected person.

Specifically, by controlling the moving unit 30 on the basis of the person having a highest body temperature, the control unit 50 moves the air conditioner main body 10 toward the person having a highest body temperature and controls the air conditioning unit 20 in conformity with the person having a highest body temperature. As a result, a cooling operation is performed on the basis of the person having a highest body temperature.

Conversely, if the current mode is a heating mode, the control unit 50 is configured to select a person having a lowest body temperature among the two or more persons.

When the person having a lowest body temperature is selected, the control unit 50 controls the moving unit 30 and the air conditioning unit 20 on the basis of the selected person.

Specifically, by controlling the moving unit 30 on the basis of the person having a lowest body temperature, the control unit 50 moves the air conditioner main body 10 toward the person having a lowest body temperature and controls the air conditioning unit 20 in conformity with the person having a lowest body temperature. As a result, a heating operation is performed on the basis of the person having a lowest body temperature.

Referring again to FIGS. 2 and 3, the infrared image sensor 62 of the human body recognition unit 60 continues to capture an image of the recognized person in real time even after the person is recognized.

Then, the microcomputer 64 is configured to recognize the person in real time based on the captured image. The microcomputer 64 provides information on the body temperature and the position of the recognized person to the control unit 50 in real time.

Upon receiving the information on the body temperature and the position of the recognized person in real time from the human body recognition unit 60, the control unit 50 controls the air conditioning unit 20 and the moving unit 30 in real time based on the received information.

In the case where the person recognized by the human body recognition unit 60 moves to another place, the control unit 50 actively controls the moving unit 30 in response to the movement of the recognized person.

Accordingly, the movable air conditioner may follow the recognized person in real time and may closely cool or heat the recognized person while following the recognized person.

When the information on the body temperature of the person recognized by the human body recognition unit 60 and the information on the surrounding temperature are provided in real time, the control unit 50 actively controls the air conditioning unit 20 in response to the information.

Thus, the air conditioning unit 20 is variably controlled in conformity with the change in the body temperature of the recognized person and the surrounding temperature. As a result, the air conditioning unit 20 is optimally controlled in conformity with the change in the body temperature of the recognized person and the surrounding temperature. This makes it possible to supply an optimal comfortable air to the recognized person.

Referring again to FIGS. 2 and 3, the movable air conditioner of the present invention further includes a display unit 70.

The display unit 70 is formed of a liquid crystal display. The display unit 70 is installed in the front upper portion of the air conditioner main body 10 and is configured to display an operation status and a series of operation processes of the movable air conditioner. Specifically, the display unit 70 is configured to display the information on a body temperature of a recognized person, the temperature on a surrounding temperature, the information on a flow rate and a temperature of a currently blown air, the information on a charged amount of a battery, and the like.

Next, an operation example of the movable air conditioner of the present invention configured as above will be described with reference to FIGS. 2 to 7.

Referring to FIGS. 2, 3, 6 and 7, the movable air conditioner is turned on (S101). In this state, the infrared image sensor 62 of the human body recognition unit 60 captures an image in a room (S103).

At this time, the infrared image sensor 62 divides the captured image into image cells 62a in the form of a matrix and inputs the image cells 62a having a matrix form to the microcomputer 64.

Upon receiving the image cells 62a from the infrared image sensor 62, the microcomputer 64 processes infrared-sensed image cells 62a among the inputted image cells 62a to determine whether the infrared-sensed image cells 62a indicates a human body (S105).

If it is determined that the infrared-sensed image cells 62a indicates a human body, the microcomputer 64 recognizes a person existing in a room (S107). In the case where two or more persons are recognized, the microcomputer 64 selectively recognizes a person having a highest body temperature in a cooling mode and selectively recognizes a person having a lowest body temperature in a heating mode.

When the recognition of a person is completed, the microcomputer 64 acquires position information such as a direction of a recognized person and a distance to a recognized person using infrared rays reflected from the recognized person (S109).

After the recognition of the person and the acquisition of the position information are completed, the control unit 50 controls the moving unit 30 based on the position information of the recognized person and moves the air conditioner main body 10 toward the recognized person (S111).

After the air conditioner main body 10 is moved toward the recognized person, the control unit 50 controls the air conditioning unit 20 to blow a cold air or a warm air toward a place where the recognized person exists (S113).

Thus, the spatial region where the recognized person exists is locally cooled or heated. As a result, the cold air or the warm air is intensively blown toward the recognized person, thereby enhancing the comfort in the room.

In the process of controlling the air conditioning unit 20, the control unit 50 measures a body temperature of a person and a surrounding temperature using the infrared rays detected by the human body recognition unit 60. By measuring the body temperature and the surrounding temperature, the control unit 50 measures a cooling or heating load in a spatial region where a person exists (S115).

Depending on the cooling or heating load thus measured, the control unit 50 actively and variably controls the air conditioning unit 20 and actively and variably controls the temperature of the air blown toward a person (S117). Thus, the cold air or the warm air having an optimal temperature and an optimal flow rate is supplied toward a person so as to enhance the comfort.

Referring again to FIGS. 2, 3 and 7, during the course of cooling or heating the recognized person, the human body recognition unit 60 continues to recognize the recognized person in real time to determine whether the recognized person moves (S119). This determination is made based on whether the positions of the infrared-sensed image cells 62a are changed.

If it is determined that the recognized person has moved, the human body recognition unit 60 acquires position information of the recognized person in real time using the infrared ray information of the recognized person (S121) and inputs the acquired position information to the control unit 50 in real time.

The control unit 50 controls the moving unit 30 in real time according to the information inputted from the human body recognition unit 60, thereby moving the air conditioner main body 10 toward the recognized person (S123).

Thus, the movable air conditioner performs close cooling or heating while following the recognized person in real time (S125). As a result, even if a person moves, the movable air conditioner can keep the vicinity of a person in a comfort state.

Second Embodiment

Figure 8:
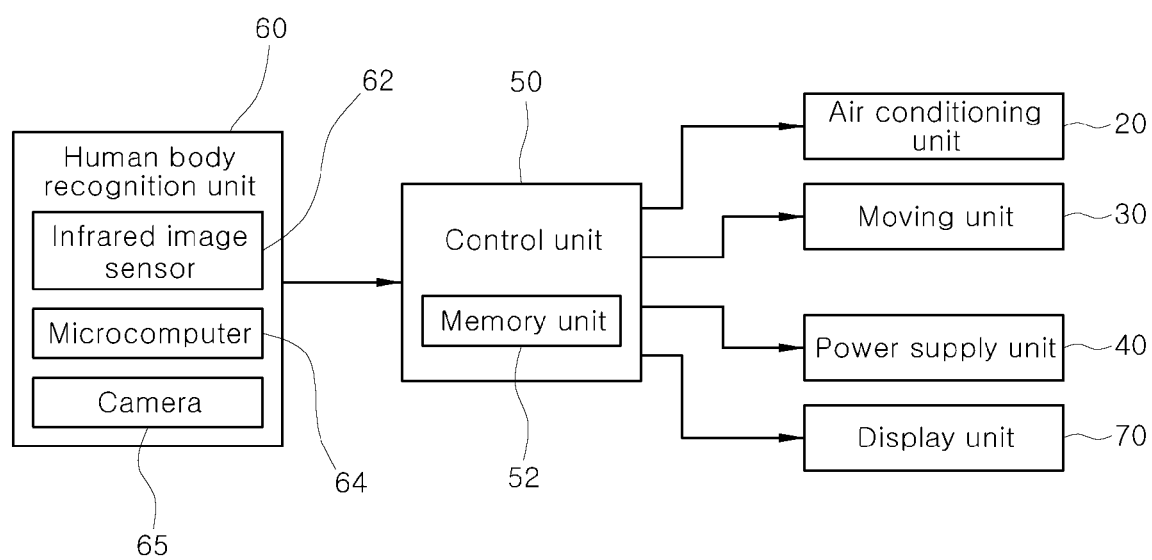
FIG. 8 is a block diagram showing a movable air conditioner according to a second embodiment of the present invention.

Next, a movable air conditioner according to a second embodiment of the present invention will be described with reference to FIG. 8.

The movable air conditioner according to the second embodiment includes a human body recognition unit 60 configured to recognize a human body of a person. The human body recognition unit 60 further includes a camera 65.

The camera 65 may be a CCD camera or a CMOS camera. The camera 65 is configured to capture an image of a specific space in a room and provide image data to the microcomputer 64.

The microcomputer 64 stores an image analysis program. By filtering the image data provided from the camera 65, the microcomputer 64 recognizes a person and acquires position information such as a direction of a recognized person and a distance to a recognized person. The microcomputer 64 inputs the acquired position information to the control unit 50.

The image analysis program, the method of recognizing a person and the method of acquiring position information are well-known in the art and, therefore, will not be described in detail.

When the person is recognized by the human body recognition unit 60 and when the position information of the person is provided, the control unit 50 controls the moving unit 30 so as to move the air conditioner main body 10 toward the place where the person exists.

After the air conditioner main body 10 is moved toward the place where the person exists, the control unit 50 controls the air conditioning unit 20 so as to blow a cold air or a warm air toward the person. As a result, the spatial region where the person exists is locally cooled or heated so that the comfort in the spatial region can be enhanced.

The control of the moving unit 30 and the air conditioning unit 20 are the same as that described in the first embodiment and, therefore, will not be described in detail.

The movable air conditioner according to the second embodiment configured as above is configured to recognize a person using the image data inputted from the camera 65. This makes it possible to enhance the accuracy of recognition of a person and to distinguish a person from a surrounding object.

As a result, it is possible to clearly distinguish a person from a surrounding object and to accurately recognize and follow a person. This makes it possible to effectively cool or heat the place where the person exists.

Third Embodiment

Figure 9:
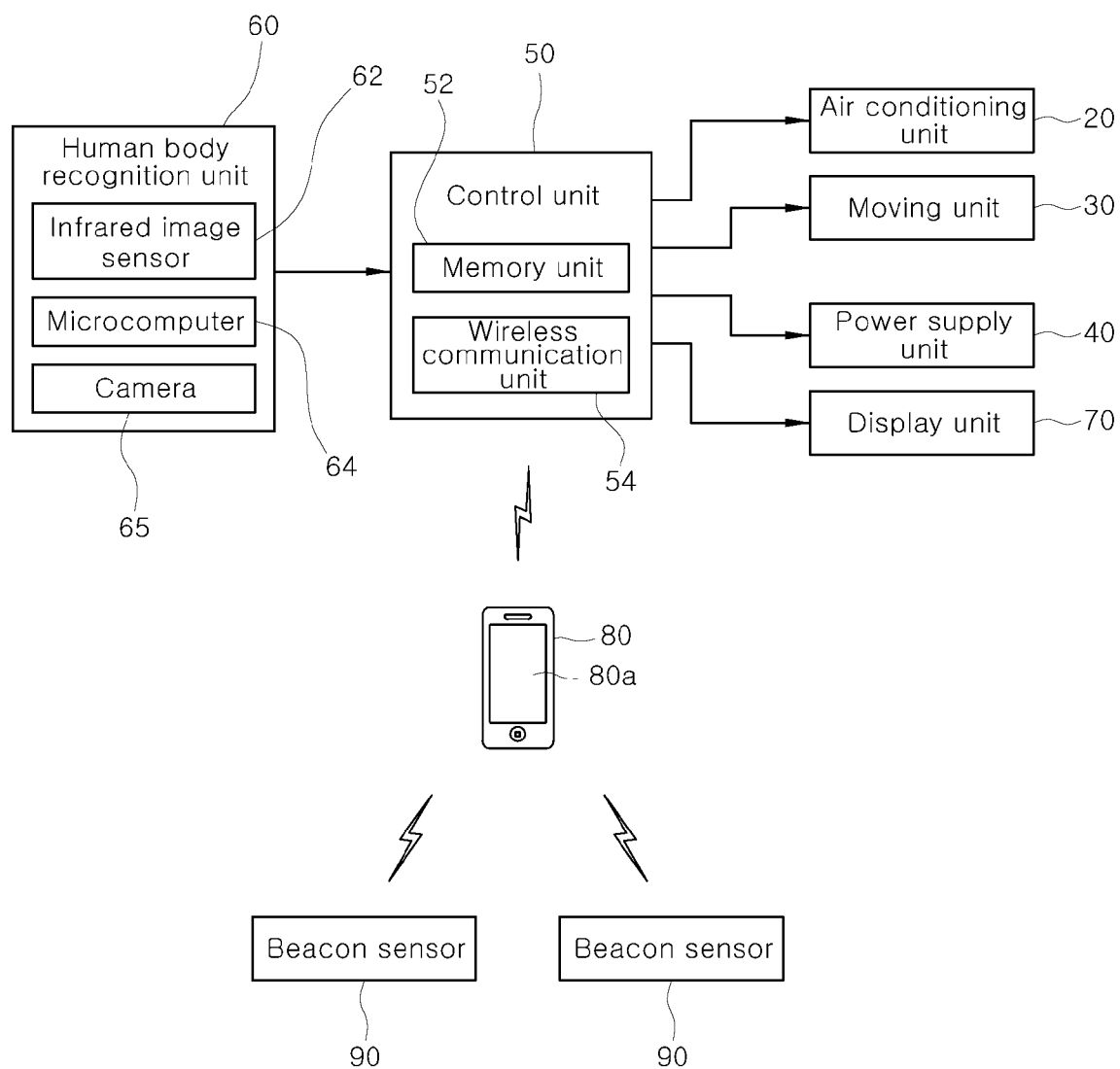
FIG. 9 is a block diagram showing a movable air conditioner according to a third embodiment of the present invention.

Next, a movable air conditioner according to a third embodiment of the present invention will be described with reference to FIG. 9.

The movable air conditioner according to the third embodiment further includes a remote control terminal 80. The remote control terminal 80 is provided with a wireless communication means not shown) such as a wireless Internet web browser, a Wi-Fi communication device, a Bluetooth communication device or the like and is formed of a smartphone, a tablet PC, a PDA or the like. Preferably, the remote control terminal 80 is formed of a smartphone.

The remote control terminal 80 stores an air conditioning control application program. The air conditioning control application program is composed of an air conditioning control application which may be purchased in an application store and may be downloaded.

Figure 10:
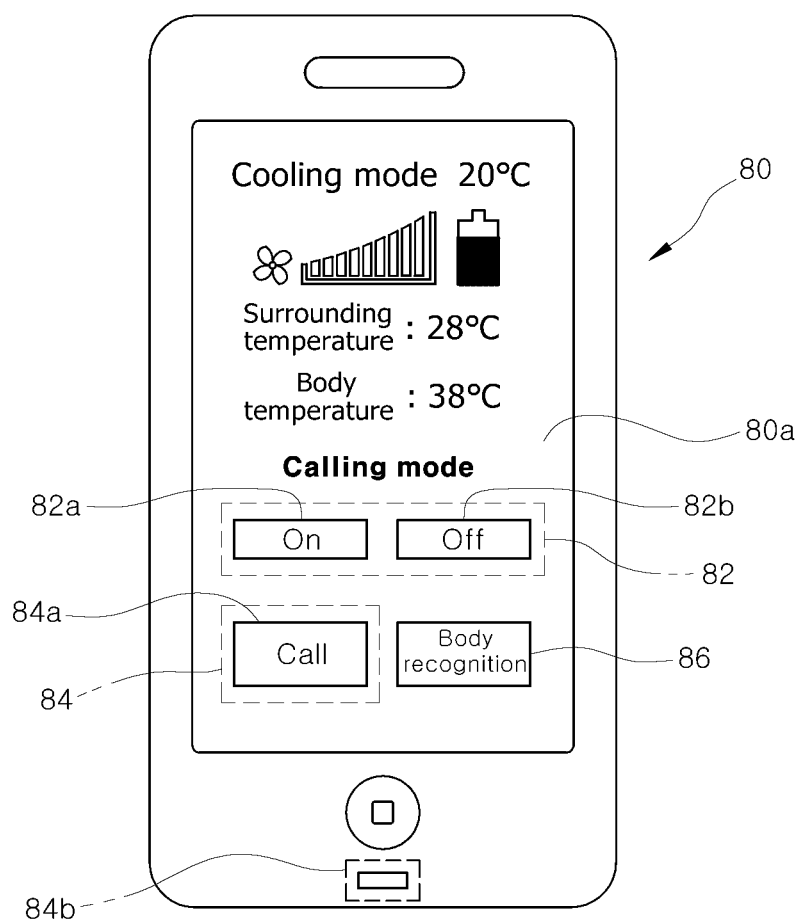
FIG. 10 is a view showing an operation example of the movable air conditioner according to the third embodiment of the present invention and illustrating an air conditioner control application displayed on a remote control terminal at the time of remotely controlling the movable air conditioner.

The remote control terminal 80 is configured so that when the air conditioning control application is executed, an on/off selection portion 82 and a call portion 84 are displayed on a touch type liquid crystal display 80*a* as shown in FIG. 10.

The on/off selection portion 82 includes an on-selection touch screen portion 82*a* and an off-selection touch screen portion 82*b*. An on-signal or an off-signal is wirelessly transmitted by touching the on-selection touch screen portion 82*a* or the off-selection touch screen portion 82*b*. The movable air conditioner is turned on or off in response to the on-signal or the off-signal. This makes it possible to turn on or off the movable air conditioner at a remote location.

The call portion 84 includes a call command touch screen portion 84*a*. A call command signal is outputted by touching the call command touch screen portion 84*a*. This makes it possible to call the movable air conditioner at a remote location and to move the movable air conditioner toward a user.

The call portion 84 further includes a call voice input means 84*b*, i.e., a microphone 84*b*. The microphone 84*b* is configured to convert a call command voice into an electrical signal when a user issues a predetermined call command voice such as "come here" or the like. This makes it possible to call the movable air conditioner with a user's voice and to move the movable air conditioner toward the user.

When the user's voice is inputted via the microphone 84*b*, the call portion 84 determines whether the inputted user's voice is a predetermined call command voice. If it is determined that the inputted user's voice is the predetermined call command voice, the call portion 84 outputs a call mode signal in response to the inputted user's voice.

Referring again to FIG. 9, the movable air conditioner according to the third embodiment further includes a plurality of beacon sensors 90 installed at specific positions in a room.

The beacon sensors 90 are wireless communication sensors installed and used for confirming a position of the remote control terminal 80. Two or more beacon sensors 90 are installed at specific positions in a room in a spaced-apart relationship with each other.

The beacon sensors 90 make wireless communication with the remote control terminal 80 via a wireless AP or a Bluetooth beacon communication device and provide a beacon signal to the remote control terminal 80.

When the beacon signal is inputted from the beacon sensors 90, the air conditioning control application of the remote control terminal 80 calculates a current position of the remote control terminal 80 using the beacon signal. Specifically, the air conditioning control application of the remote control terminal 80 calculates three-dimensional coordinates, X, Y and Z, and outputs the three-dimensional coordinates thus calculated.

In this regard, the air conditioning control application of the remote control terminal 80 has a three-dimensional position information recognition program for three-dimensionally tracing the position of the remote control terminal 80 based on the beacon signal of the beacon sensors 90.

The air conditioning control application of the remote control terminal 80 is configured to wirelessly transmit the remote control terminal position information only when the user calls the movable air conditioner via the call portion 84.

For example, only when the user touches the call command touch screen portion 84*a* or inputs a call command voice via the microphone 84*b*, the air conditioning control application of the remote control terminal 80 outputs a call mode signal and wirelessly transmits the remote control terminal position information.

Referring again to FIG. 9, the control unit 50 of the movable air conditioner according to the third embodiment includes a wireless communication unit 54.

The wireless communication unit 54 is configured to make wireless communication with the remote control terminal 80 via a wireless communication means (not shown) such as the wireless Internet, a Wi-Fi device, a Bluetooth device or the like.

When an on-signal or an off-signal is wirelessly transmitted from the remote control terminal 80, the wireless communication unit 54 receives the on-signal or the off-signal and inputs the on-signal or the off-signal to the control unit 50.

As the on-signal or the off-signal is inputted from the wireless communication unit 54, the control unit 50 is configured to turn on or off the movable air conditioner in response to the on-signal or the off-signal. This makes it possible to turn on or off the movable air conditioner using the remote control terminal 80.

On the other hand, when the call command signal and the remote control terminal position information are wirelessly transmitted from the remote control terminal 80, the wireless communication unit 54 receives the call command signal and the remote control terminal position information and inputs the call command signal and the remote control terminal position information to the control unit 50.

When the call command signal and the remote control terminal position information are inputted from the wireless communication unit 54, the control unit 50 controls the movable air conditioner based on the call command signal and the remote control terminal position information.

In particular, the moving unit 30 of the movable air conditioner is controlled to move the movable air conditioner to the remote control terminal 80. Therefore, the movable air conditioner is moved to the person who has the remote control terminal 80.

Thus, it is possible to blow a cold air or a warm air to the person holding the remote control terminal 80, thereby cooling or heating the person holding the remote control terminal 80.

As a result, the movable air conditioner may be called through the remote control terminal 80. The movable air conditioner actively cools or heats the calling place while moving to the calling place.

On the other hand, the control unit 50 of the movable air conditioner is configured so that the call mode control according to the call of the remote control terminal 80 is preferentially executed rather than the human body recognition mode control using the human body recognition unit 60.

For example, even if the person recognized by the human body recognition unit 60 is being cooled or heated, when the call command signal is inputted from the remote control terminal 80, the control is preferentially executed in the call mode so that the movable air conditioner is first moved to the remote control terminal 80 which has transmitted the call command signal.

Referring to FIG. 10, the air conditioning control application of the remote control terminal 80 further includes a human body recognition command touch screen portion 86.

The human body recognizing command touch screen portion 86 is used for switching the movable air conditioner from the calling mode to the human body recognition mode. When the user touches the touch screen portion 86, a human body recognition command signal is outputted and is wirelessly transmitted to the air conditioner main body 10.

When the human body recognition command signal is wirelessly transmitted from b the remote control terminal 80, the control unit 50 of the air conditioner main body 10 is switched to the human body recognition mode in response to the human body recognition command signal, thereby controlling the air conditioner main body 10 in the human body recognition mode.

Particularly, the air conditioner main body 10 is controlled to move toward the person recognized by the human body recognition unit 60, whereby cooling or heating is performed based on the person recognized by the human body recognition unit 60.

Referring again to FIG. 9, the wireless communication unit 54 of the control unit 50 is configured to wirelessly transmit the control information of the currently-controlled movable air conditioner to the remote control terminal 80.

For example, the wireless communication unit 54 is configured to wirelessly transmit the body temperature information, the surrounding temperature information, the flow rate and temperature of the currently blown air, the battery charge amount, the current mode information and the like to the remote control terminal 80.

Accordingly, the remote control terminal 80 is also configured to receive the control information of the currently-controlled movable air conditioner.

On the other hand, when the control information of the movable air conditioner is wirelessly transmitted from the wireless communication unit 54 of the air conditioner main body 10, the remote control terminal 80 receives the wirelessly transmitted control information of the movable air conditioner.

The remote control terminal 80 receiving the control information of the movable air conditioner displays the control information on the liquid crystal display unit 80a in real time through the air conditioning control application.

In particular, as shown in FIG. 10, the liquid crystal display unit 80a displays the body temperature information, the surrounding temperature information, the flow rate and temperature of the currently blown air, the battery charge amount, the current mode information and the like using specific symbols and characters.

Therefore, the control information of the movable air conditioner can be confirmed even at a remote place from the air conditioner main body 10.

According to the movable air conditioner of the first to third embodiments of the present invention having such a configuration, the cooling or heating is performed based on the human body of the person recognized by the human body recognition unit 60. It is therefore possible to accurately cool or heat the region where cooling or heating is actually required. This makes it possible to remarkably improve the cooling or heating efficiency.

In addition, since the person recognized by the human body recognition unit 60 is closely cooled or heated while following the person, the person's surroundings can always be kept comfortable despite the movement of the person. This makes it possible to enhance the cooling or heating effect.

In addition, since the temperature and flow rate of the cold air or the warm air actively and variably controlled according to the body temperature and the surrounding temperature, it is possible to constantly supply the cold air or the warm air to a person. This makes it possible to provide enhanced comfort.

Furthermore, since the movable air conditioner is moved to a calling place according to the user's wireless call command transmitted from the remote control terminal 80, it is possible to actively cool and heat a place where the user makes a call. This makes it possible to improve the user's convenience as much as possible.

Fourth Embodiment

Next, the movable air conditioner according to a fourth embodiment of the present invention will be described with reference to FIG. 11.

The movable air conditioner of the fourth embodiment further includes an auxiliary detection unit 100 installed in the air conditioner main body 10.

The auxiliary detection unit 100 is formed of an infrared sensor, a camera, an ultrasonic sensor or the like. The auxiliary detection unit 100 is fixedly installed on the rear portion of the air conditioner main body 10. Specifically, the auxiliary detection unit 100 is fixedly installed on the side of the waste air exhaust port 14 formed on the rear surface of the air conditioner main body 10.

The auxiliary detection unit 100 is configured to capture an image of the rear portion of the air conditioner main body 10. Specifically, the auxiliary detection unit 100 is configured to capture, in real time, an image of the rear portion of the air conditioner main body 10, i.e., the portion of the air conditioner main body 10 from which the waste cold air or the waste warm air is discharged from the waste air exhaust port 14, and to input the image of the rear portion of the air conditioner main body 10 to the control unit 50 in real time.

In this regard, the auxiliary detection unit 100 is preferably composed of an infrared sensor. The infrared sensor of the auxiliary detection unit 100 captures an image of the rear portion of the air conditioner main body 10 from which the waste cold air or the waste warm air is discharged, and then divides the captured image into image cells in the form of a matrix. Hereinafter, as the auxiliary detection unit 100, an infrared sensor will be described as an example.

The control unit 50 stores an image analysis program, for example, an infrared analysis program, an ultrasonic analysis program or the like. In the present embodiment, description will be made on an example in which the control unit 50 stores an infrared analysis program. When the matrix type image cells are inputted from the infrared sensor of the auxiliary detection unit 100 in real time, a person and an object are distinguished by processing infrared-sensed image cells among the inputted image cells.

When the distinguishment of the person and the object is completed, the control unit 50 determines whether there is a person in the imaging area of the auxiliary detection unit 100.

Figure 12:
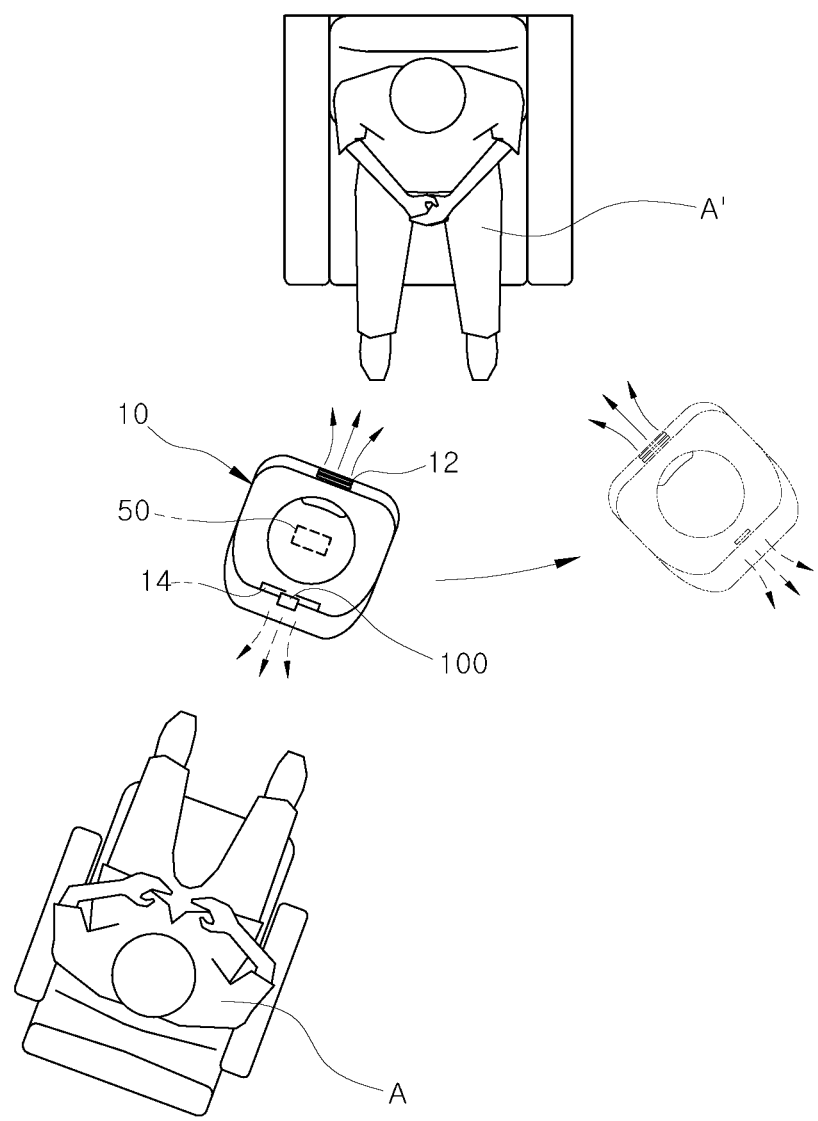
FIG. 12 is a view showing an operation example of the movable air conditioner according to the fourth embodiment of the present invention and illustrating an operation example in the case where a waste cold air or a waste warm air is discharged toward a person.

If it is confirmed that the person A is present as shown in FIG. 12, the control unit 50 determines that the person A is present in the vicinity of the waste air exhaust port 14 and further that the waste cold air or the waste warm air is discharged to the person A from the waste air exhaust port 14.

Figure 11:
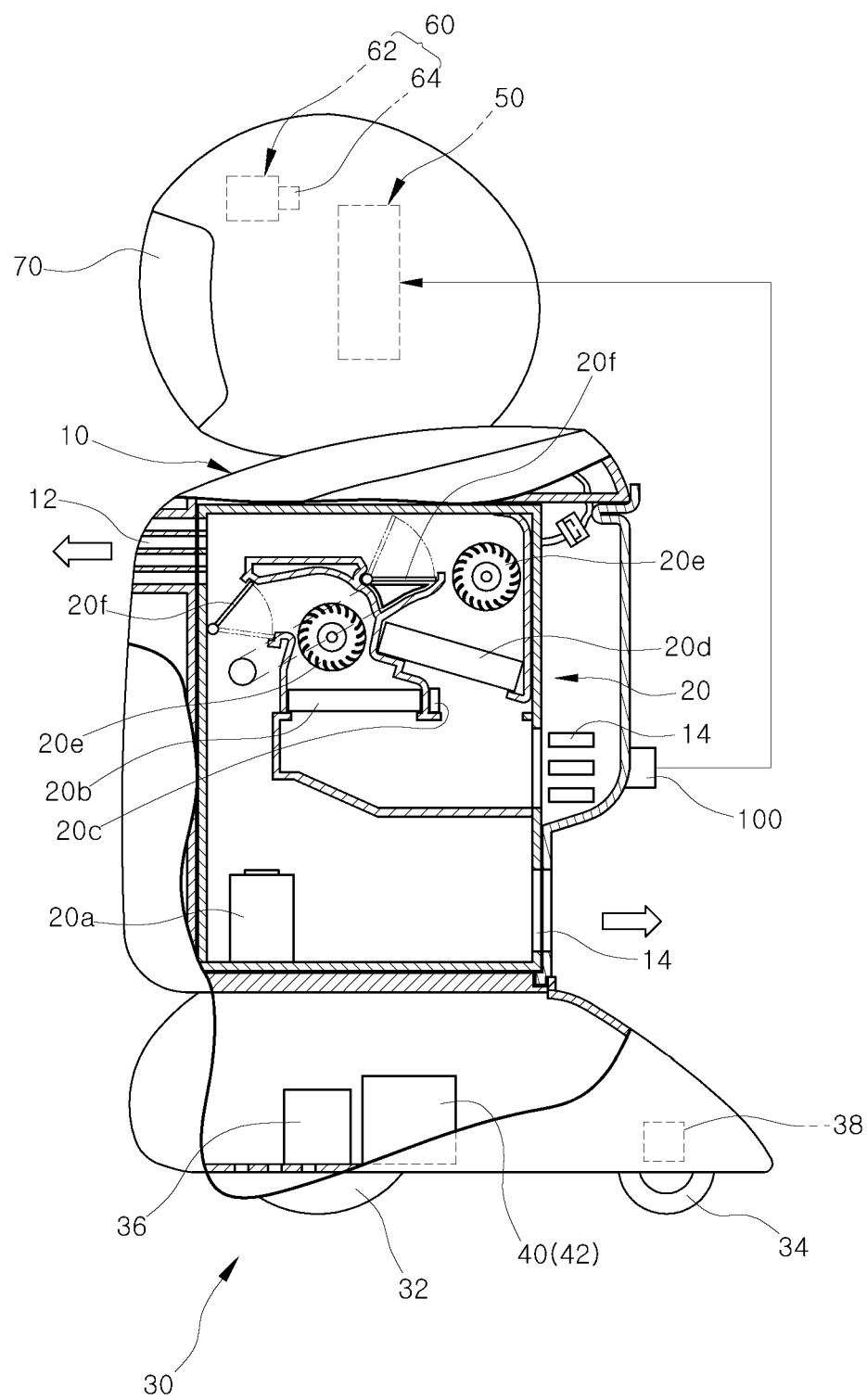
FIG. 11 is a side sectional view showing a movable air conditioner according to a fourth embodiment of the present invention.

When such determination is made, as shown in FIG. 11, the control unit 50 controls the driving wheel 32 and the steering wheel 34 of the moving unit 30 so as to readjust the position of the air conditioner main body 10.

Specifically, as shown in FIG. 12, the position of the air conditioner main body 10 is accurately readjusted so that the waste air exhaust port 14 formed on the rear surface of the air conditioner main body 10 is arranged so as to face the region where the person A is not recognized.

Thus, the control is performed so that the waste cold air or the waste warm air is not discharged toward the person from the waste air exhaust port 14. As a result, it is possible to prevent the discomfort of the user due to the waste cold air or the waste warm air discharged from the waste air exhaust port 14, thereby improving the user's comfort.

In the process of re-adjusting the position of the air conditioner main body 10 to have the waste air exhaust port 14 face the region where the person A is not recognized, the control unit 50 performs control so that the air discharge port 12 formed in the front portion of the air conditioner main body 10 constantly faces a specific person A' who desires to be cooled and heated.

Figure 13:
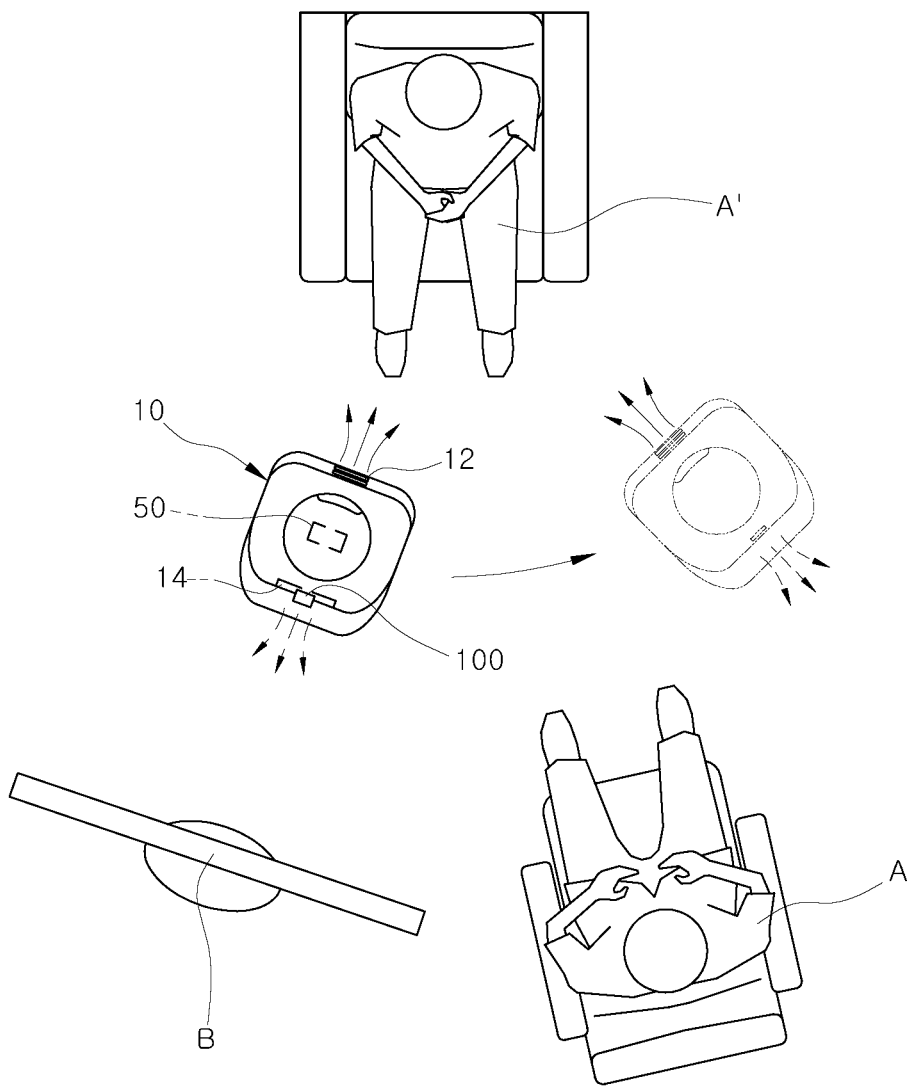
FIG. 13 is a view showing an operation example of the movable air conditioner according to the fourth embodiment of the present invention and illustrating an operation example in the case where a waste cold air or a waste warm air is discharged toward a television set.

Referring to FIG. 13, in the process of distinguishing a person and an object by processing the image cells inputted from the infrared sensor of the auxiliary detection unit 100, the control unit 50 determines whether a television set B is present in the imaging region of the auxiliary detection unit 100.

If it is determined that the television set B is present, the control unit 50 determines that the television B is located on the side of the waste air exhaust port 14 and further that the waste cold air or the waste warm air is discharged toward the television set B from the waste air exhaust port 14.

When such determination is made, the control unit 50 controls the driving wheel 32 and the steering wheel 34 of the moving unit 30 to readjust the position of the air conditioner main body 10.

Specifically, the posture of the air conditioner main body 10 is accurately readjusted so that the waste air exhaust port 14 formed on the rear surface of the air conditioner main body 10 is arranged to face the region where the television set B and the person A are not recognized.

Therefore, control is performed so that the waste cold air or the waste warm air is not discharged from the waste air exhaust port 14 toward the people A and the television set B. This makes it possible to prevent damage of the television set B due to the waste cold air or the waste warm air.

In the process of readjusting the position of the air conditioner main body 10 to have the waste air exhaust port 14 avoid the television set B, the control unit 50 performs control so that the air discharge port 12 formed in the front portion of the air conditioner main body 10 constantly faces a specific person A' who desires to be cooled and heated.

Next, an operation example of the present invention having such a configuration will be described with reference to FIGS. 11 to 14.

Figure 14:
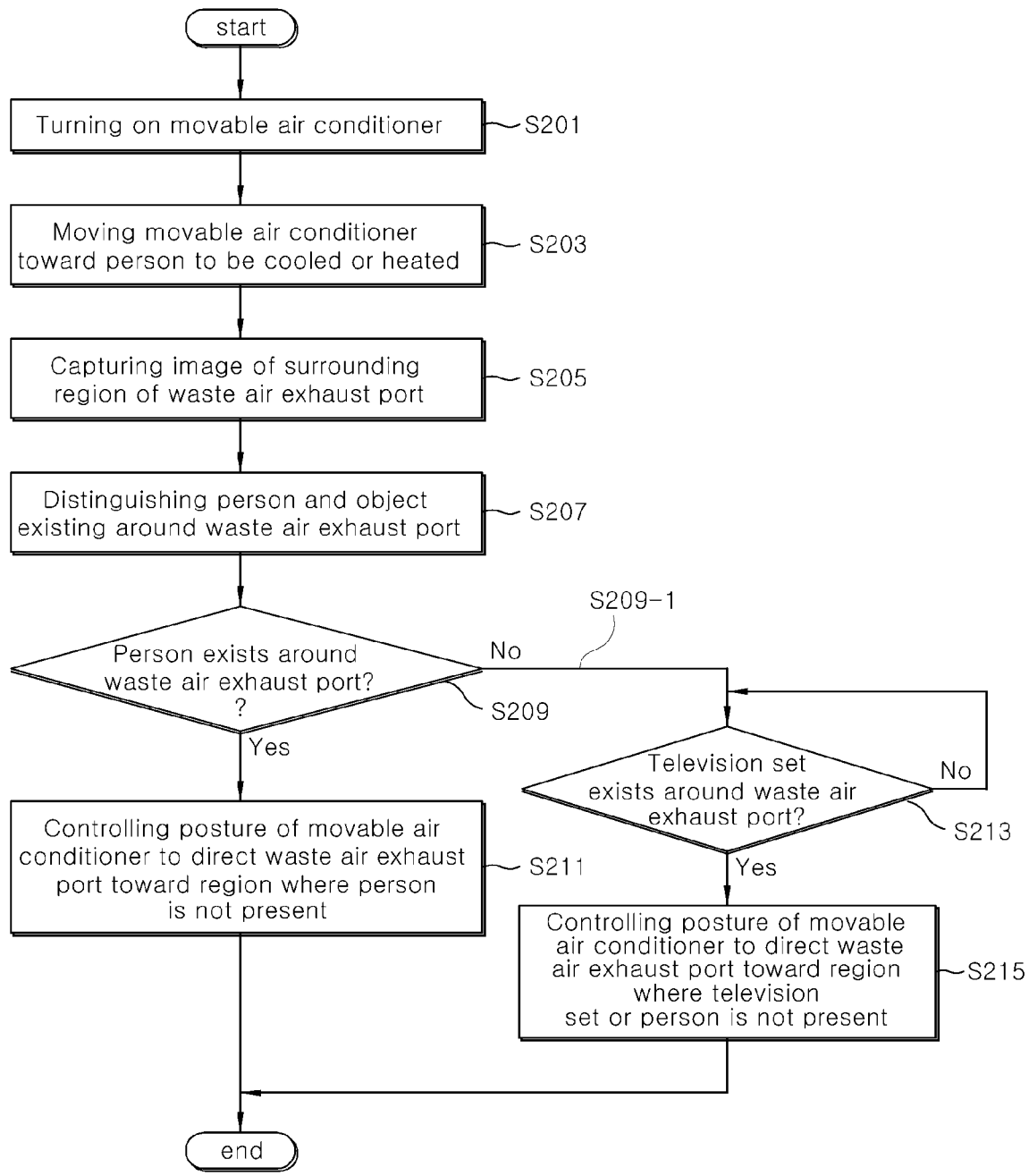
FIG. 14 is a flowchart showing an operation example of the movable air conditioner according to the fourth embodiment of the present invention.

Referring first to FIG. 14, the movable air conditioner is turned on (S201). In this state, when a person who desires to be cooled or heated calls the movable air conditioner through the remote control terminal 80 or when a person who desires to be cooled or heated is detected by the human body recognition unit 60, the air conditioner main body 10 moves toward the person who wants to be cooled and heated (S203).

At this time, as shown in FIGS. 11 and 12, the control unit 50 performs control so that the air discharge port 12 formed in the front portion of the air conditioner main body 10 faces the person A who desires to be cooled and heated.

When the movement of the air conditioner main body 10 toward the person A who desires to be cooled and heated is completed, the portion of the air conditioner main body 10 in the vicinity of the waste air exhaust port 14 is imaged by the auxiliary detection unit 100 (S205).

The image data of the peripheral portion of the waste air exhaust port 14 is inputted to the control unit 50. At this time, the control unit 50 processes the image of the rear portion of the air conditioner main body 10 to distinguish a person and an object (S207).

When the distinguishment of the person and the object is completed, the control unit 50 determines whether there is a person in the vicinity of the waste air exhaust port 14 (S209).

If it is determined that there is a person, the control unit 50 determines that a person A is present in the vicinity of the waste air exhaust port 14 and further that the waste cold air or the waste warm air is likely to be discharged toward the person A from the waste air exhaust port 14.

If such determination is made, as shown in FIGS. 11 and 12, the control unit 50 controls the moving unit 30 so that the waste air exhaust port 14 formed on the rear surface of the air conditioner main body 10 faces a region where the person A is not recognized (S211).

Thus, during the operation of the air conditioning unit 20, the waste cold air or the waste warm air discharged from the waste air exhaust port 14 is not directed toward the person. As a result, it is possible to prevent the discomfort of the user due to the waste cold air or the waste warm air discharged from the waste air exhaust port 14. This makes it possible to improve the user's comfort.

On the other hand, if it is determined in step S209 that no person is present around the waste air exhaust port 14 (S209-1), the control unit 50 determines whether a television set is present in the vicinity of the waste air exhaust port 14 (S213).

If it is determined that there is a television set, the control unit 50 determines that the television set B is in the vicinity of the waste air exhaust port 14 and further that the waste cold air or the waste warm air is likely to be discharged toward the television set B from the waste air exhaust port 14.

When such determination is made, as shown in FIGS. 11 and 13, the control unit 50 controls the moving unit 30 so that the waste air exhaust port 14 formed on the rear surface of the air conditioner main body 10 faces a region where the television set B and the person A are not recognized (S215).

Thus, during the operation of the air conditioning unit 20, the waste cold air or the waste warm air discharged from the waste air exhaust port 14 is not directed to the television set B or the person A. This prevents the user's discomfort and the damage to the television set B due to the waste cold air or the waste warm air discharged from the waste air exhaust port 14.

According to the fourth embodiment of the present invention having such a configuration, when a person is detected in the vicinity of the waste air exhaust port 14, the position of the air conditioner main body 10 is controlled to have the waste air exhaust port 14 face the region where a person is not present. This makes it possible to prevent the waste air exhaust port 14 from facing a person.

Furthermore, since the waste air exhaust port 14 is prevented from facing a person, it is possible to prevent the waste cold air or the waste warm air from being discharged toward the person.

In addition, since the waste cold air or the waste warm air is prevented from being discharged toward the person, it is possible to prevent the user from being uncomfortable due to the waste cold air or the waste warm air discharged from the waste air exhaust port 14.

Fifth Embodiment

Next, a movable air conditioner according to a fifth embodiment of the present invention will be described with reference to FIGS. 15 to 18.

Figure 15:
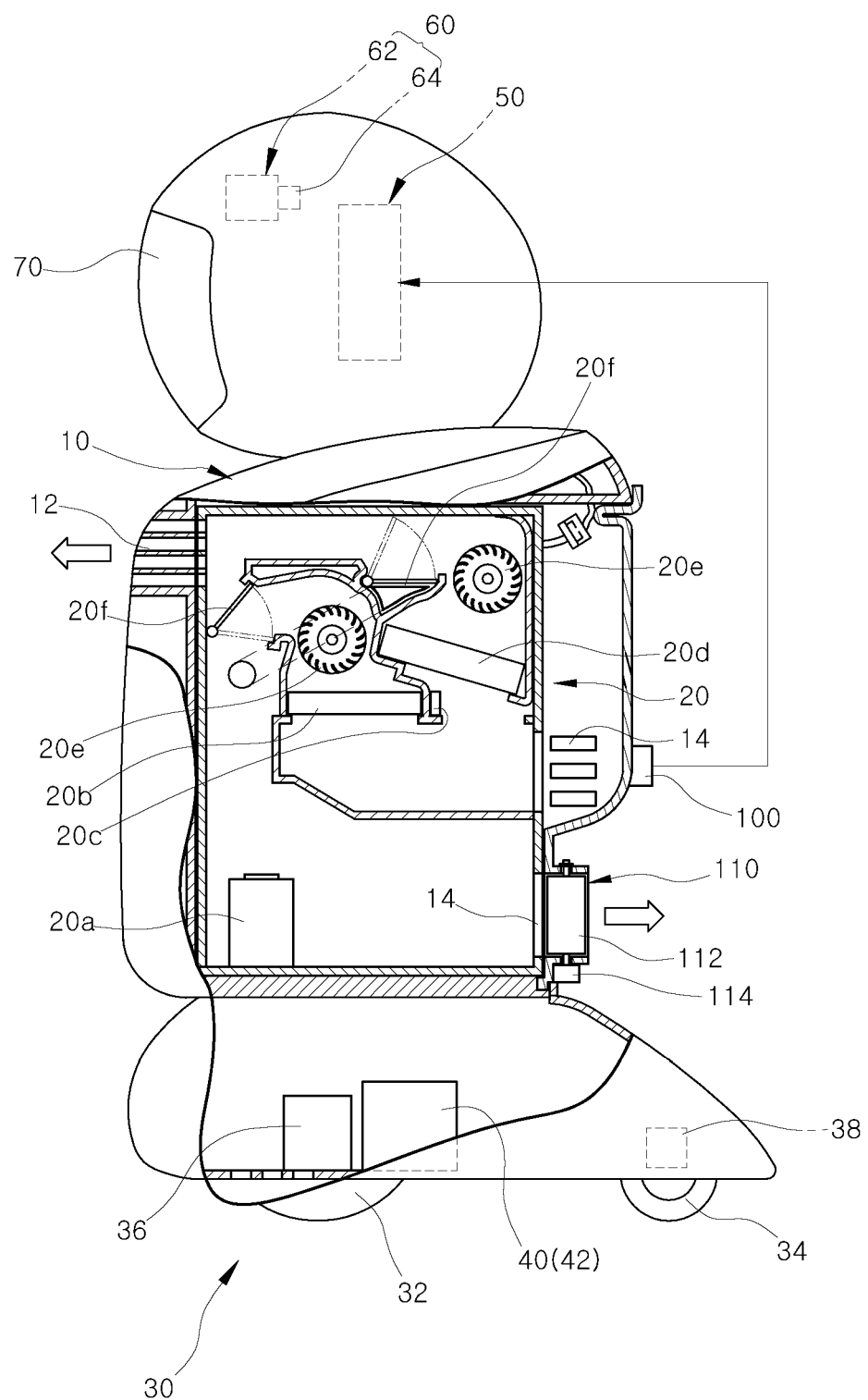
FIG. 15 is a side sectional view showing a movable air conditioner according to a fifth embodiment of the present invention.

Referring first to FIG. 15, as in the fourth embodiment described above, the movable air conditioner of the fifth embodiment includes an auxiliary detection unit 100 that captures an image of the surrounding region of the waste air exhaust port 14 of the air conditioner main body 10 and inputs the image to the control unit 50 in real time.

The control unit 50 processes the image of the surrounding region of the waste air exhaust port 14 inputted from the auxiliary detection unit 100 to distinguish a person and an object. The control unit 50 determines whether there is a television set or a person in the imaging region of the auxiliary detection unit 100.

Figure 16:
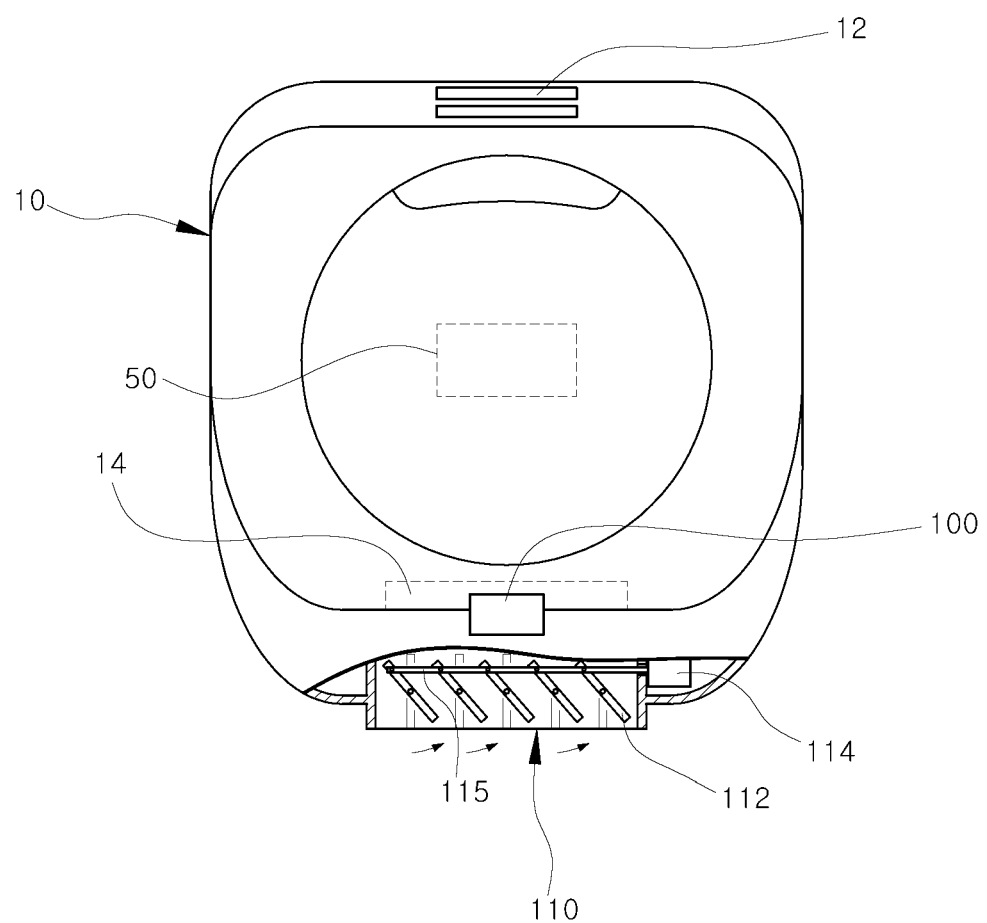
FIG. 16 is a plan sectional view showing main parts of the movable air conditioner according to the fifth embodiment of the present invention.
Figure 17:
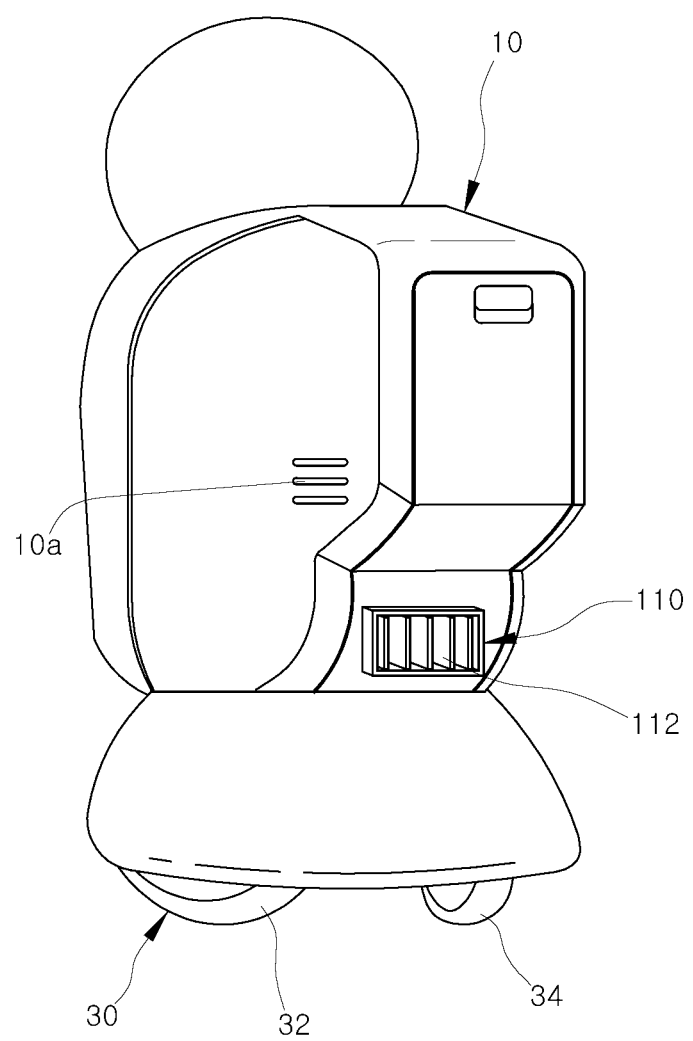
FIG. 17 is a perspective view showing main parts of the movable air conditioner according to the fifth embodiment of the present invention.

As shown in FIGS. 15 to 17, the movable air conditioner of the fifth embodiment further includes a vent grill 110 installed in the waste air exhaust port 14 of the air conditioner main body 10.

The vent grill 110 includes a plurality of blades 112. The blades 112 are rotatable by an actuator 114 and a link 115 interlocked with each other. The blades 112 variably control the air discharge direction depending on the rotational position thereof.

Figure 18:
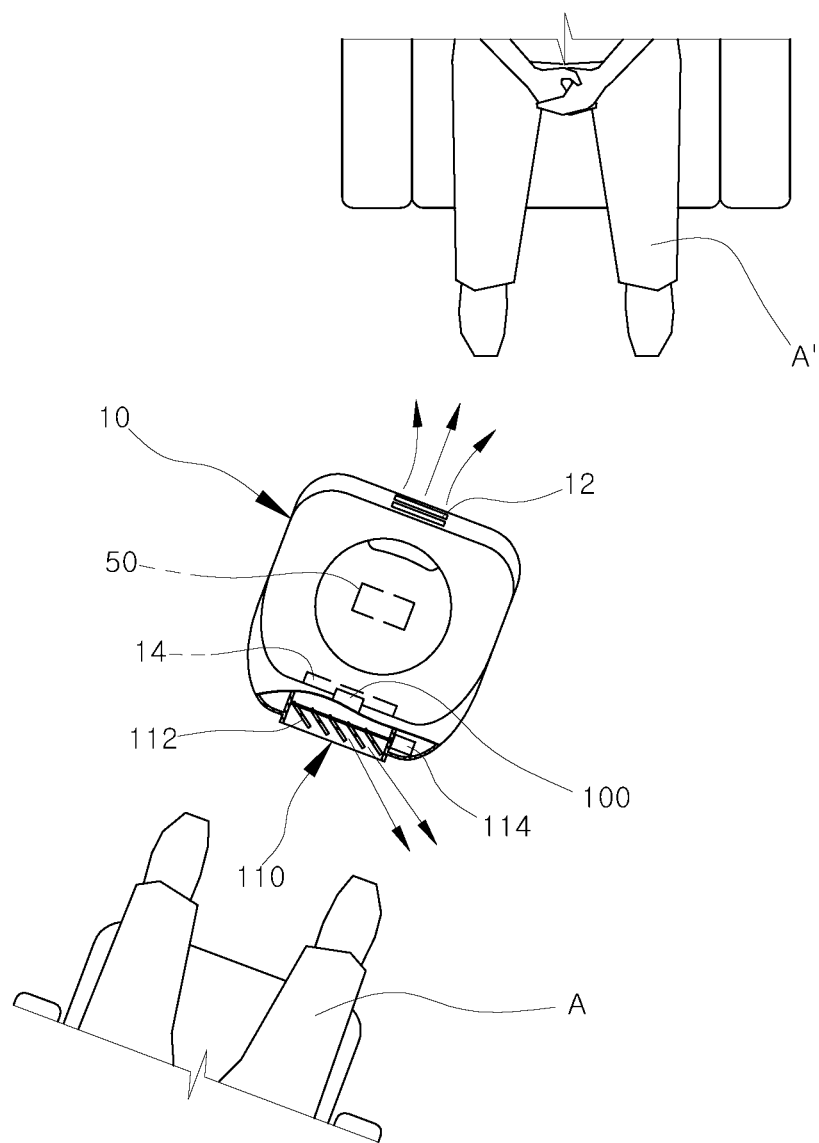
FIG. 18 is a view showing an operation example of the movable air conditioner according to the fifth embodiment of the present invention.

In the process of determining whether there is a person or a television set in the surrounding region of the waste air exhaust port 14 through the detection data inputted from the auxiliary detection unit 100, when a person A or a television set is present in the surrounding region of the waste air exhaust port 14 as shown in FIG. 18, the control unit 50 controls the actuator 114 of the vent grill 110 to convert the direction of the blades 112 of the vent grill 110 into other directions.

Specifically, the direction of the blades 112 of the vent grill 110 is converted into a direction facing a region that cannot be detected by the auxiliary detection unit 100. For example, the blades 112 of the vent grill 110 are controlled to rotate toward the rightmost position or the leftmost position.

Thus, the blades 112 of the vent grill 110 are controlled so that the waste cold air or the waste warm air is not discharged toward a person from the waste air exhaust port 14. This makes it possible to prevent the discomfort of the user due to the waste cold air or the waste warm air discharged from the waste air exhaust port 14, thereby improving the user's comfort.

Unlike the fourth embodiment, the movable air conditioner of the fifth embodiment having such a configuration can change the discharge direction of the waste cold air or the waste warm air without having to readjust the position of the air conditioner main body 10. It is therefore possible to prevent the waste cold air or the waste warm air from being discharged toward a person.

While some preferred embodiments of the present invention have been described above, the present invention is not limited to these embodiments. It is to be understood that various changes and modifications may be made without departing from the scope of the invention defined in the claims.

What is claimed is:

1. A movable air conditioner, comprising:
   an air conditioner main body;
   an air conditioning unit installed in the air conditioner main body and configured to generate a cold air or a warm air;
   a moving unit configured to move the air conditioner main body;
   a control unit configured to control the air conditioning unit and the moving unit; and
   a human body recognition unit configured to recognize a person existing in a specific space, the human body recognition unit comprising an infrared image sensor configured to capture an image of the specific space, sense infrared rays emitted from an object or a person existing in the specific space and divide the image of the specific space into matrix type image cells;

wherein the control unit is configured to control the moving unit so that the air conditioner main body is moved toward the person recognized by the human body recognition unit so as to supply the cold air or the warm air from the air conditioning unit to the person recognized by the human body recognition unit.

2. The movable air conditioner of claim 1, wherein the control unit is configured to recognize a human body of a person by processing infrared-sensed image cells among the matrix type image cells inputted from the infrared image sensor.

3. The movable air conditioner of claim 2, wherein the control unit is configured to measure a body temperature of a person and a surrounding temperature using infrared rays sensed by the infrared image sensor, calculate a cooling or heating load based on the body temperature and the surrounding temperature, and variably control the air conditioning unit according to the cooling or heating load to variably control a temperature of an air blown toward a person.

4. The movable air conditioner of claim 3, further comprising:
a memory unit configured to store cooling or heating load values in association with body temperatures and surrounding temperatures,
wherein the control unit reads a cooling or heating load value corresponding to the body temperature and the surrounding temperature from the memory unit and controls the air conditioning unit based on the cooling or heating load value thus read.

5. The movable air conditioner of claim 1, wherein when two or more persons are recognized, the control unit selects a person having a highest body temperature from the two or more persons in a cooling mode and selects a person having a lowest body temperature from the two or more persons in a heating mode.

6. The movable air conditioner of claim 1, wherein when the person recognized by the human body recognition unit is moved to another place, the control unit controls the moving unit in response to the movement of the person so that the air conditioner main body follows the person.

7. The movable air conditioner of claim 2, wherein the human body recognition unit further includes a camera configured to acquire image data of a specific space by capturing an image of the specific space, and
the control unit is configured to recognize a person by filtering the image data of the specific space provided from the camera and controls the moving unit so that the air conditioner main body is moved toward the person.

8. The movable air conditioner of claim 1, further comprising:
a remote control terminal provided with a call portion capable of inputting a call command and configured to wirelessly transmit the call command inputted through the call portion; and
a position information providing unit configured to provide position information of the remote control terminal, wherein the position information providing unit includes two or more beacon sensors installed at intervals in the specific space and configured to wirelessly output a beacon signal to the remote control terminal, and a three-dimensional position information recognition program configured to process the beacon signal wirelessly transmitted from the beacon sensors and calculate three-dimensional coordinates of a current position of the remote control terminal;
wherein the control unit is configured to wirelessly receive the call command transmitted from the remote control terminal and the position information of the remote control terminal transmitted from the position information providing unit, and
when the call command is wirelessly transmitted from the remote control terminal, the control unit is converted into a call mode to control the moving unit according to the position information of the remote control terminal received from the position information providing unit so that the air conditioner main body is moved toward the remote control terminal.

9. The movable air conditioner of claim 8, wherein the remote control terminal includes a touch type liquid crystal display unit, and
the call portion is a call command touch screen portion displayed on the touch type liquid crystal display unit and configured to wirelessly transmit the call command when the call command touch screen portion is touched by a user.

10. The movable air conditioner of claim 9, wherein the call portion further includes a microphone capable of inputting a call command voice, and
when a user's voice is inputted through the microphone, the remote control terminal determines whether the user's voice is a predetermined call command voice, and wirelessly transmits the call command when the user's voice is the predetermined call command voice.

11. The movable air conditioner of claim 10, wherein the remote control terminal further includes a human body recognition command touch screen portion,
the remote control terminal is configured to wirelessly transmit a human body recognition command as the human body recognition command touch screen portion is touched by a user, and
the control unit is converted into a human body recognition mode in response to the human body recognition command wirelessly transmitted from the remote control terminal and is configured to control the moving unit so that the air conditioner main body is moved toward the person recognized by the human body recognition unit.

12. The movable air conditioner of claim 11, wherein the control unit is configured to wirelessly transmit control information of the movable air conditioner to the remote control terminal, and
the remote control terminal is configured to receive the control information of the movable air conditioner wirelessly transmitted from the control unit and display the control information on the liquid crystal display unit in real time.

13. The movable air conditioner of claim 1, wherein the air conditioner main body includes an air discharge port configured to discharge the cold air or the warm air generated in the air conditioning unit to a place to be cooled or heated, a waste air exhaust port configured to discharge a waste cold air or a waste warm air not used for cooling or heating, and an auxiliary detection unit configured to detect a surrounding region of the waste air exhaust port, and
the control unit is configured to adjust an air discharge direction of the waste air exhaust port depending on a detection result of the auxiliary detection unit wherein the auxiliary detection unit is configured to detect a person and an object existing in the surrounding region of the waste air exhaust port, and when the auxiliary detection unit detects a person existing in the surrounding region of the waste air exhaust port, the control unit controls the moving unit to adjust a position of the air conditioner main body so that the waste air exhaust port faces a region where a person is not present.

14. The movable air conditioner of claim 13, wherein when the position of the air conditioner main body is adjusted so that the waste air exhaust port faces the region where a person is not present, the control unit controls the moving unit so that the air discharge port constantly faces a place to be cooled or heated.

15. The movable air conditioner of claim 14, wherein the auxiliary detection unit is one of an infrared sensor, a camera and an ultrasonic sensor configured to detect a person and an object existing in the vicinity of the waste air exhaust port by capturing an image of the surrounding region of the waste air exhaust port, and the control unit is configured to determine presence or absence of a person in the surrounding region of the waste air exhaust port by processing the image of the surrounding region of the waste air exhaust port using an image analysis program stored in the control unit.

16. The movable air conditioner of claim 15, wherein the air discharge port is formed on a front surface of the air conditioner main body, the waste air exhaust port is formed on a rear surface of the air conditioner main body, and the auxiliary detection unit is configured to capture an image of a rear region of the air conditioner main body to which the waste cold air or the waste warm air is discharged.

17. The movable air conditioner of claim 13, further comprising:

a vent grill installed in the waste air exhaust port and provided with a plurality of blades capable of adjusting an air discharge direction depending on a rotational position thereof and an actuator capable of adjusting the rotational position of the blades, wherein the auxiliary detection unit is configured to detect a person and an object existing in the surrounding region of the waste air exhaust port, and when the auxiliary detection unit detects a person existing in the surrounding region of the waste air exhaust port, the control unit controls the actuator to change the rotational position of the blades so that the waste cold air or the waste warm air is not discharged from the waste air exhaust port toward the person.

18. The movable air conditioner of claim 17, wherein when a person is present in the surrounding region of the waste air exhaust port, the control unit controls the actuator to move the blades to a rightmost position or a leftmost position.

* * * * *